(12) United States Patent
Shimada

(10) Patent No.: US 11,544,646 B2
(45) Date of Patent: Jan. 3, 2023

(54) OPTIMIZATION METHOD AND APPARATUS FOR MINIMIZING THE MAKESPAN USING AN ISING MACHINE

(71) Applicant: FUJITSU LIMITED, Kawasaki (JP)

(72) Inventor: Daichi Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/206,184

(22) Filed: Mar. 19, 2021

(65) Prior Publication Data
US 2021/0383298 A1    Dec. 9, 2021

(30) Foreign Application Priority Data
Jun. 4, 2020    (JP) .............................. JP2020-097825

(51) Int. Cl.
*G06Q 10/06*    (2012.01)
*G06Q 10/04*    (2012.01)

(52) U.S. Cl.
CPC ....... *G06Q 10/06313* (2013.01); *G06Q 10/04* (2013.01); *G06Q 10/06312* (2013.01)

(58) Field of Classification Search
None
See application file for complete search history.

(56) References Cited

U.S. PATENT DOCUMENTS

| | | | | |
|---|---|---|---|---|
| 5,467,268 A | * | 11/1995 | Sisley | G06Q 10/06 705/7.21 |
| 5,568,381 A | * | 10/1996 | Hara | G06Q 10/063 700/111 |

(Continued)

FOREIGN PATENT DOCUMENTS

| | | | | |
|---|---|---|---|---|
| EP | 2357603 A1 | * | 8/2011 | ............. G06Q 10/04 |
| EP | 2840535 A1 | * | 2/2015 | ............. G06N 5/022 |

(Continued)

OTHER PUBLICATIONS

Loukil, Taïcir, Jacques Teghem, and Daniel Tuyttens. "Solving multi-objective production scheduling problems using metaheuristics." European journal of operational research 161.1 (2005): 42-61. (Year: 2005).*

(Continued)

*Primary Examiner* — Brian M Epstein
*Assistant Examiner* — Derick J Holzmacher
(74) *Attorney, Agent, or Firm* — Fujitsu Patent Center

(57) ABSTRACT

An optimization apparatus for repeatedly obtaining a constraint violating solution, a constraint satisfying solution, and an approximate solution in a resource-constrained project scheduling problem performs setting an end time of a target optimization period at a point between a first finish time equal to a finish time of a latest version of the constraint violating solution and a second finish time equal to a finish time of a latest version of the constraint satisfying solution, followed by obtaining the approximate solution using a metaheuristic algorithm, making a determination as to whether the approximate solution violates constraint or satisfy the constraint, and performing, based on the determination, updating the first finish time with a finish time of (Continued)

the approximate solution when the approximate solution violates the constraint, and updating the second finish time with a finish time of the approximate solution when the approximate solution satisfies the constraint.

8 Claims, 16 Drawing Sheets

(56) References Cited

U.S. PATENT DOCUMENTS

| | | | | |
|---|---|---|---|---|
| 5,623,404 | A * | 4/1997 | Collins | G06Q 10/06 |
| | | | | 705/7.17 |
| 6,216,109 | B1 * | 4/2001 | Zweben | G06Q 10/04 |
| | | | | 705/7.12 |
| 6,578,005 | B1 * | 6/2003 | Lesaint | G06Q 10/06 |
| | | | | 705/7.14 |
| 7,606,776 | B1 | 10/2009 | Havens et al. | |
| 8,606,386 | B2 * | 12/2013 | Pereira | G06Q 10/06 |
| | | | | 700/95 |
| 2002/0029370 | A1 * | 3/2002 | Michalewicz | G06N 5/003 |
| | | | | 716/136 |
| 2008/0270331 | A1 * | 10/2008 | Taylor | G06N 3/126 |
| | | | | 706/13 |
| 2010/0010859 | A1 * | 1/2010 | Ratakonda | G06Q 10/06 |
| | | | | 705/7.14 |
| 2011/0224816 | A1 * | 9/2011 | Pereira | G06Q 10/06 |
| | | | | 700/100 |
| 2013/0208315 | A1 * | 8/2013 | Zeng | G06F 3/1211 |
| | | | | 358/1.15 |
| 2014/0025610 | A1 * | 1/2014 | Fox | G06Q 10/06313 |
| | | | | 706/13 |
| 2014/0249882 | A1 * | 9/2014 | Li | G06Q 10/06313 |
| | | | | 705/7.23 |
| 2015/0058270 | A1 * | 2/2015 | Kawata | G06Q 10/0637 |
| | | | | 706/46 |
| 2015/0134386 | A1 * | 5/2015 | Jogalekar | G06Q 10/063118 |
| | | | | 705/7.13 |
| 2015/0205759 | A1 * | 7/2015 | Israel | G06F 17/11 |
| | | | | 703/2 |
| 2016/0179081 | A1 * | 6/2016 | Sun | G05B 19/4069 |
| | | | | 700/97 |
| 2018/0165618 | A1 * | 6/2018 | Menache | G06Q 10/06313 |
| 2019/0278829 | A1 * | 9/2019 | Takatsu | G06F 17/17 |
| 2020/0210853 | A1 * | 7/2020 | Shimokawa | G06F 30/20 |
| 2021/0335639 | A1 * | 10/2021 | Qian | H01L 21/67276 |

FOREIGN PATENT DOCUMENTS

| | | | |
|---|---|---|---|
| JP | H11-195066 A | 7/1999 | |
| JP | 2018-185639 A | 11/2018 | |
| WO | WO-2005008936 A2 * | 1/2005 | G06Q 10/04 |
| WO | WO-2016105825 A1 * | 6/2016 | G05B 19/4069 |

OTHER PUBLICATIONS

Demeulemeester, Erik, and Willy Herroelen. "A branch-and-bound procedure for the multiple resource-constrained project scheduling problem." Management science 38.12 (1992): 1803-1818. (Year: 1992).*
Tsai, Ying-Wei. "Resource constrained project scheduling using simulated annealing and tabu search." (1996). (Year: 1996).*
Ballestin, Francisco, and Roel Leus. "Resource-constrained project scheduling for timely project completion with stochastic activity durations." Production and operations management 18.4 (2009): 459-474. (Year: 2009).*
Kolisch, Rainer, and Sönke Hartmann. "Heuristic algorithms for the resource-constrained project scheduling problem: Classification and computational analysis." Project scheduling. Springer, Boston, MA, 1999. 147-178. (Year: 1999).*
Boctor, Fayez F. "Resource-constrained project scheduling by simulated annealing." International Journal of Production Research 34.8 (1996): 2335-2351. (Year: 1996).*
Satake, Tsuyoshi, et al. "Simulated annealing approach for minimizing the makespan of the general job-shop." International Journal of Production Economics 60 (1999): 515-522. (Year: 1999).*
Lombardi, Michele et al: "Optimal methods for resource allocation and scheduling: a cross-disciplinary survey", Constraints ; An International Journal, Kluwer Academic Publishers, BO, vol. 17, No. 1, 11 Jan. 11, 2012, pp. 51-85, XP035004692, ISSN: 1572-9354, DOI: 10.1007/S10601-011-9115-6.
Weise, Thomas, "Global Optimization Algorithms—Theory and Application-", Internet Citation, Jun. 26, 2009 (Jun. 26, 2009), pp. 1-820, XP007919619, Retrieved from the Internet: URL: http://www.it-weise.de [retrieved on Oct. 24, 2011].
Extended European Search Report dated Sep. 7, 2021 for corresponding European Patent Application No. 21162265.9, 10 pages.

* cited by examiner

FIG.9

| TASK | TASK DURATION |
|---|---|
| TASK #1 | 9 |
| TASK #2 | 7 |
| TASK #3 | 5 |
| TASK #4 | 5 |
| TASK #5 | 3 |
| TASK #6 | 2 |

| Time | TASK #1 | | | TASK #2 | | | TASK #3 | | | TASK #4 | | | TASK #5 | | | TASK #6 | | |
|---|---|---|---|---|---|---|---|---|---|---|---|---|---|---|---|---|---|---|
| | FACILITY 1 | FACILITY 2 | FACILITY 3 | FACILITY 1 | FACILITY 2 | FACILITY 3 | FACILITY 1 | FACILITY 2 | FACILITY 3 | FACILITY 1 | FACILITY 2 | FACILITY 3 | FACILITY 1 | FACILITY 2 | FACILITY 3 | FACILITY 1 | FACILITY 2 | FACILITY 3 |
| 8:30 | O | O | O | O | O | O | O | O | O | O | O | O | O | O | O | O | O | O |
| 9:00 | O | O | O | O | O | O | O | O | O | O | O | O | O | O | O | O | O | O |
| 9:30 | O | O | O | O | O | O | O | O | O | O | O | O | O | O | O | O | O | O |
| 10:00 | O | O | O | O | O | O | O | O | O | O | O | O | O | O | O | O | O | O |
| 10:30 | O | O | O | O | O | O | O | O | O | O | O | O | O | O | O | O | O | O |
| 11:00 | O | O | O | O | O | O | O | O | O | O | O | O | O | O | O | O | O | O |
| 11:30 | O | O | O | O | O | O | O | O | O | O | O | O | O | O | O | O | O | O |
| 12:00 | O | O | O | O | O | O | O | O | O | O | O | O | O | O | O | O | O | O |
| 12:30 | O | O | O | O | O | O | O | O | O | O | O | O | O | O | O | O | O | O |
| 13:00 | O | O | O | O | O | O | O | O | O | O | O | O | O | O | O | O | O | O |
| 13:30 | O | O | O | O | O | O | O | O | O | O | O | O | O | O | O | O | O | O |
| 14:00 | O | O | O | O | O | O | O | O | O | O | O | O | O | O | O | O | O | O |
| 14:30 | O | O | O | O | O | O | O | O | O | O | O | O | O | O | O | O | O | O |
| 15:00 | O | O | O | O | O | O | O | O | O | O | O | O | O | O | O | O | O | O |
| 15:30 | O | O | O | O | O | O | O | O | O | O | O | O | O | O | O | O | O | O |

FIG.11

| | TASK #1 | | | TASK #2 | | | TASK #3 | | | TASK #4 | | | TASK #5 | | | TASK #6 | | |
|---|---|---|---|---|---|---|---|---|---|---|---|---|---|---|---|---|---|---|
| | FA-CIL-ITY 1 | FA-CIL-ITY 2 | FA-CIL-ITY 3 | FA-CIL-ITY 1 | FA-CIL-ITY 2 | FA-CIL-ITY 3 | FA-CIL-ITY 1 | FA-CIL-ITY 2 | FA-CIL-ITY 3 | FA-CIL-ITY 1 | FA-CIL-ITY 2 | FA-CIL-ITY 3 | FA-CIL-ITY 1 | FA-CIL-ITY 2 | FA-CIL-ITY 3 | FA-CIL-ITY 1 | FA-CIL-ITY 2 | FA-CIL-ITY 3 |
| 8:30 | 1 | 0 | 0 | 0 | 1 | 0 | 0 | 0 | 0 | 0 | 0 | 0 | 0 | 0 | 0 | 0 | 0 | 0 |
| 9:00 | 0 | 0 | 0 | 0 | 0 | 0 | 0 | 0 | 0 | 0 | 0 | 0 | 0 | 0 | 0 | 0 | 0 | 0 |
| 9:30 | 0 | 0 | 0 | 0 | 0 | 0 | 0 | 0 | 0 | 0 | 0 | 0 | 0 | 0 | 0 | 0 | 0 | 0 |
| 10:00 | 0 | 0 | 0 | 0 | 0 | 0 | 0 | 0 | 0 | 0 | 0 | 0 | 0 | 0 | 0 | 0 | 0 | 0 |
| 10:30 | 0 | 0 | 0 | 0 | 0 | 0 | 0 | 0 | 0 | 0 | 0 | 0 | 0 | 0 | 0 | 0 | 0 | 0 |
| 11:00 | 0 | 0 | 0 | 0 | 0 | 0 | 0 | 0 | 0 | 0 | 0 | 0 | 0 | 0 | 0 | 0 | 0 | 0 |
| 11:30 | 0 | 0 | 0 | 0 | 0 | 0 | 0 | 0 | 0 | 0 | 0 | 0 | 0 | 0 | 0 | 0 | 0 | 0 |
| 12:00 | 0 | 0 | 0 | 0 | 0 | 0 | 0 | 0 | 0 | 0 | 0 | 0 | 0 | 0 | 0 | 0 | 0 | 0 |
| 12:30 | 0 | 0 | 0 | 0 | 0 | 0 | 0 | 0 | 0 | 0 | 0 | 0 | 0 | 0 | 0 | 0 | 0 | 0 |
| 13:00 | 0 | 0 | 0 | 0 | 0 | 0 | 0 | 0 | 0 | 0 | 0 | 0 | 0 | 0 | 0 | 0 | 0 | 0 |
| 13:30 | 0 | 0 | 0 | 0 | 0 | 0 | 0 | 0 | 0 | 0 | 0 | 0 | 0 | 0 | 0 | 0 | 0 | 0 |
| 14:00 | 0 | 0 | 0 | 0 | 0 | 0 | 0 | 0 | 0 | 0 | 0 | 0 | 0 | 0 | 0 | 0 | 0 | 0 |
| 14:30 | 0 | 0 | 0 | 0 | 0 | 0 | 0 | 0 | 0 | 0 | 0 | 0 | 0 | 0 | 0 | 0 | 0 | 0 |
| 15:00 | 0 | 0 | 0 | 0 | 0 | 0 | 0 | 0 | 0 | 0 | 0 | 0 | 0 | 0 | 0 | 0 | 0 | 0 |
| 15:30 | 0 | 0 | 0 | 0 | 0 | 0 | 0 | 0 | 0 | 0 | 0 | 0 | 0 | 0 | 0 | 0 | 0 | 0 |

| | TASK #1 | | | TASK #2 | | | TASK #3 | | | TASK #4 | | | TASK #5 | | | TASK #6 | | |
|---|---|---|---|---|---|---|---|---|---|---|---|---|---|---|---|---|---|---|
| | FA-CIL-ITY 1 | FA-CIL-ITY 2 | FA-CIL-ITY 3 | FA-CIL-ITY 1 | FA-CIL-ITY 2 | FA-CIL-ITY 3 | FA-CIL-ITY 1 | FA-CIL-ITY 2 | FA-CIL-ITY 3 | FA-CIL-ITY 1 | FA-CIL-ITY 2 | FA-CIL-ITY 3 | FA-CIL-ITY 1 | FA-CIL-ITY 2 | FA-CIL-ITY 3 | FA-CIL-ITY 1 | FA-CIL-ITY 2 | FA-CIL-ITY 3 |
| 8:30 | 1 | 0 | 0 | 0 | 1 | 0 | 0 | 0 | 1 | 0 | 0 | 0 | 0 | 0 | 0 | 0 | 0 | 0 |
| 9:00 | 0 | 0 | 0 | 0 | 0 | 0 | 0 | 0 | 0 | 0 | 0 | 0 | 0 | 0 | 0 | 0 | 0 | 0 |
| 9:30 | 0 | 0 | 0 | 0 | 0 | 0 | 0 | 0 | 0 | 0 | 0 | 0 | 0 | 0 | 0 | 0 | 0 | 0 |
| 10:00 | 0 | 0 | 0 | 0 | 0 | 0 | 0 | 0 | 0 | 0 | 0 | 0 | 0 | 0 | 0 | 0 | 0 | 0 |
| 10:30 | 0 | 0 | 0 | 0 | 0 | 0 | 0 | 0 | 0 | 0 | 0 | 0 | 0 | 0 | 0 | 0 | 0 | 0 |
| 11:00 | 0 | 0 | 0 | 0 | 0 | 0 | 0 | 0 | 0 | 0 | 0 | 0 | 0 | 0 | 0 | 0 | 0 | 0 |
| 11:30 | 0 | 0 | 0 | 0 | 0 | 0 | 0 | 0 | 0 | 0 | 0 | 0 | 0 | 0 | 0 | 0 | 0 | 0 |
| 12:00 | 0 | 0 | 0 | 0 | 0 | 0 | 0 | 0 | 0 | 0 | 0 | 0 | 0 | 0 | 0 | 0 | 0 | 0 |
| 12:30 | 0 | 0 | 0 | 0 | 0 | 0 | 0 | 0 | 0 | 0 | 0 | 0 | 0 | 0 | 0 | 0 | 0 | 0 |
| 13:00 | 0 | 0 | 0 | 0 | 0 | 0 | 0 | 0 | 0 | 0 | 0 | 0 | 0 | 0 | 0 | 0 | 0 | 0 |
| 13:30 | 0 | 0 | 0 | 0 | 0 | 0 | 0 | 0 | 0 | 0 | 0 | 0 | 0 | 0 | 0 | 0 | 0 | 0 |
| 14:00 | 0 | 0 | 0 | 0 | 0 | 0 | 0 | 0 | 0 | 0 | 0 | 0 | 0 | 0 | 0 | 0 | 0 | 0 |
| 14:30 | 0 | 0 | 0 | 0 | 0 | 0 | 0 | 0 | 0 | 0 | 0 | 0 | 0 | 0 | 0 | 0 | 0 | 0 |
| 15:00 | 0 | 0 | 0 | 0 | 0 | 0 | 0 | 0 | 0 | 0 | 0 | 0 | 0 | 0 | 0 | 0 | 0 | 0 |
| 15:30 | 0 | 0 | 0 | 0 | 0 | 0 | 0 | 0 | 0 | 0 | 0 | 0 | 0 | 0 | 0 | 0 | 0 | 0 |

FIG.14

| | TASK #1 | | | TASK #2 | | | TASK #3 | | | TASK #4 | | | TASK #5 | | | TASK #6 | | |
|---|---|---|---|---|---|---|---|---|---|---|---|---|---|---|---|---|---|---|
| | FACILITY 1 | FACILITY 2 | FACILITY 3 | FACILITY 1 | FACILITY 2 | FACILITY 3 | FACILITY 1 | FACILITY 2 | FACILITY 3 | FACILITY 1 | FACILITY 2 | FACILITY 3 | FACILITY 1 | FACILITY 2 | FACILITY 3 | FACILITY 1 | FACILITY 2 | FACILITY 3 |
| 8:30 | 1 | 0 | 0 | 0 | 1 | 0 | 0 | 0 | 1 | 0 | 0 | 0 | 0 | 0 | 0 | 0 | 0 | 0 |
| 9:00 | 0 | 0 | 0 | 0 | 0 | 0 | 0 | 0 | 0 | 0 | 0 | 0 | 0 | 0 | 0 | 0 | 0 | 0 |
| 9:30 | 0 | 0 | 0 | 0 | 0 | 0 | 0 | 0 | 0 | 0 | 0 | 0 | 0 | 0 | 0 | 0 | 0 | 0 |
| 10:00 | 0 | 0 | 0 | 0 | 0 | 0 | 0 | 0 | 0 | 0 | 0 | 0 | 0 | 0 | 0 | 0 | 0 | 0 |
| 10:30 | 0 | 0 | 0 | 0 | 0 | 0 | 0 | 0 | 0 | 0 | 0 | 0 | 0 | 0 | 0 | 0 | 0 | 0 |
| 11:00 | 0 | 0 | 0 | 0 | 0 | 0 | 0 | 0 | 0 | 0 | 0 | 1 | 0 | 0 | 0 | 0 | 0 | 0 |
| 11:30 | 0 | 0 | 0 | 0 | 0 | 0 | 0 | 0 | 0 | 0 | 0 | 0 | 0 | 0 | 0 | 0 | 0 | 0 |
| 12:00 | 0 | 0 | 0 | 0 | 0 | 0 | 0 | 0 | 0 | 0 | 0 | 0 | 0 | 0 | 0 | 0 | 0 | 0 |
| 12:30 | 0 | 0 | 0 | 0 | 0 | 0 | 0 | 0 | 0 | 0 | 0 | 0 | 0 | 0 | 0 | 0 | 0 | 0 |
| 13:00 | 0 | 0 | 0 | 0 | 0 | 0 | 0 | 0 | 0 | 0 | 0 | 0 | 0 | 0 | 0 | 0 | 0 | 0 |
| 13:30 | 0 | 0 | 0 | 0 | 0 | 0 | 0 | 0 | 0 | 0 | 0 | 0 | 0 | 0 | 0 | 0 | 0 | 0 |
| 14:00 | 0 | 0 | 0 | 0 | 0 | 0 | 0 | 0 | 0 | 0 | 0 | 0 | 0 | 0 | 0 | 0 | 0 | 0 |
| 14:30 | 0 | 0 | 0 | 0 | 0 | 0 | 0 | 0 | 0 | 0 | 0 | 0 | 0 | 0 | 0 | 0 | 0 | 0 |
| 15:00 | 0 | 0 | 0 | 0 | 0 | 0 | 0 | 0 | 0 | 0 | 0 | 0 | 0 | 0 | 0 | 0 | 0 | 0 |
| 15:30 | 0 | 0 | 0 | 0 | 0 | 0 | 0 | 0 | 0 | 0 | 0 | 0 | 0 | 0 | 0 | 0 | 0 | 0 |

FIG.15

| | TASK #1 | | | TASK #2 | | | TASK #3 | | | TASK #4 | | | TASK #5 | | | TASK #6 | | |
|---|---|---|---|---|---|---|---|---|---|---|---|---|---|---|---|---|---|---|
| | FA-CIL-ITY 1 | FA-CIL-ITY 2 | FA-CIL-ITY 3 | FA-CIL-ITY 1 | FA-CIL-ITY 2 | FA-CIL-ITY 3 | FA-CIL-ITY 1 | FA-CIL-ITY 2 | FA-CIL-ITY 3 | FA-CIL-ITY 1 | FA-CIL-ITY 2 | FA-CIL-ITY 3 | FA-CIL-ITY 1 | FA-CIL-ITY 2 | FA-CIL-ITY 3 | FA-CIL-ITY 1 | FA-CIL-ITY 2 | FA-CIL-ITY 3 |
| 8:30  | 1 | 0 | 0 | 0 | 1 | 0 | 0 | 0 | 1 | 0 | 0 | 0 | 0 | 0 | 0 | 0 | 0 | 0 |
| 9:00  | 0 | 0 | 0 | 0 | 0 | 0 | 0 | 0 | 0 | 0 | 0 | 0 | 0 | 0 | 0 | 0 | 0 | 0 |
| 9:30  | 0 | 0 | 0 | 0 | 0 | 0 | 0 | 0 | 0 | 0 | 0 | 0 | 0 | 0 | 0 | 0 | 0 | 0 |
| 10:00 | 0 | 0 | 0 | 0 | 0 | 0 | 0 | 0 | 0 | 0 | 0 | 0 | 0 | 0 | 0 | 0 | 0 | 0 |
| 10:30 | 0 | 0 | 0 | 0 | 0 | 0 | 0 | 0 | 0 | 0 | 0 | 0 | 0 | 0 | 0 | 0 | 0 | 0 |
| 11:00 | 0 | 0 | 0 | 0 | 0 | 0 | 0 | 0 | 0 | 0 | 0 | 0 | 0 | 0 | 0 | 0 | 0 | 0 |
| 11:30 | 0 | 0 | 0 | 0 | 0 | 0 | 0 | 0 | 0 | 0 | 0 | 1 | 0 | 0 | 0 | 0 | 0 | 0 |
| 12:00 | 0 | 0 | 0 | 0 | 0 | 0 | 0 | 0 | 0 | 0 | 0 | 0 | 0 | 0 | 1 | 0 | 0 | 0 |
| 12:30 | 0 | 0 | 0 | 0 | 0 | 0 | 0 | 0 | 0 | 0 | 0 | 0 | 0 | 0 | 0 | 0 | 0 | 0 |
| 13:00 | 0 | 0 | 0 | 0 | 0 | 0 | 0 | 0 | 0 | 0 | 0 | 0 | 0 | 0 | 0 | 0 | 0 | 0 |
| 13:30 | 0 | 0 | 0 | 0 | 0 | 0 | 0 | 0 | 0 | 0 | 0 | 0 | 0 | 0 | 0 | 0 | 0 | 0 |
| 14:00 | 0 | 0 | 0 | 0 | 0 | 0 | 0 | 0 | 0 | 0 | 0 | 0 | 0 | 0 | 0 | 0 | 0 | 0 |
| 14:30 | 0 | 0 | 0 | 0 | 0 | 0 | 0 | 0 | 0 | 0 | 0 | 0 | 0 | 0 | 0 | 0 | 0 | 0 |
| 15:00 | 0 | 0 | 0 | 0 | 0 | 0 | 0 | 0 | 0 | 0 | 0 | 0 | 0 | 0 | 0 | 0 | 0 | 0 |
| 15:30 | 0 | 0 | 0 | 0 | 0 | 0 | 0 | 0 | 0 | 0 | 0 | 0 | 0 | 0 | 0 | 0 | 0 | 0 |

FIG.16

OPTIMIZATION METHOD AND APPARATUS FOR MINIMIZING THE MAKESPAN USING AN ISING MACHINE

CROSS-REFERENCE TO RELATED APPLICATIONS

The present application is based upon and claims the benefit of priority from the prior Japanese Patent Application No. 2020-097825 filed on Jun. 4, 2020, with the Japanese Patent Office, the entire contents of which are incorporated herein by reference.

FIELD

The disclosures herein relate to an optimization apparatus, an optimization method, and an optimization program.

BACKGROUND

The resource-constrained project scheduling problem is a problem in combinatorial optimization. The resource-constrained project scheduling problem concerns a situation in which constrains are imposed on a plurality of tasks and a plurality of resources, and requires the plurality of resources to be allocated to the plurality of tasks while satisfying the constraints such that the duration of the project is shorter than a target optimization period. An example of an objective function used in the resource-constrained project scheduling problem is a project completion time (i.e., the time at which all the tasks are completed). The problem that minimizes the makespan is referred to as a makespan minimization problem.

RELATED-ART DOCUMENTS

[Patent Document]
[Patent Document 1] Japanese Laid-open Patent Publication No. 2018-185639
[Patent Document 2] Japanese Patent Laid-open Publication No. 11-195066

SUMMARY OF THE INVENTION

Problem to be Solved by the Invention

Summary

According to an aspect of the embodiment, an optimization apparatus for repeatedly obtaining a constraint violating solution, a constraint satisfying solution, and an approximate solution in a resource-constrained project scheduling problem includes a memory and one or more arithmetic circuits coupled to the memory and configured to perform setting an end time of a target optimization period at a point between a first finish time that is equal to a finish time of a latest version of the constraint violating solution and a second finish time that is equal to a finish time of a latest version of the constraint satisfying solution, followed by obtaining the approximate solution by use of a metaheuristic algorithm, making a determination as to whether the approximate solution violates constraint or satisfy the constraint, and performing, based on the determination, updating the first finish time with a finish time of the approximate solution when the approximate solution violates the constraint, and updating the second finish time with a finish time of the approximate solution when the approximate solution satisfies the constraint, wherein the approximate solution is repeatedly obtained while updating the first finish time and the second finish time.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 9 is a drawing illustrating an example of a task list;

FIG. 10 is a drawing illustrating an example of the initial state of a model defining a resource-constrained project scheduling problem;

FIG. 11 is a drawing illustrating the state of the model defining a resource-constrained project scheduling problem as observed after allocating one task;

FIG. 12 is a drawing illustrating the state of the model defining a resource-constrained project scheduling problem as observed after allocating two tasks;

FIG. 13 is a drawing illustrating the state of the model defining a resource-constrained project scheduling problem as observed after allocating three tasks;

FIG. 14 is a drawing illustrating the state of the model defining a resource-constrained project scheduling problem as observed after allocating four tasks;

FIG. 15 is a drawing illustrating the state of the model defining a resource-constrained project scheduling problem as observed after allocating five tasks; and FIG. 16 is a drawing illustrating the state of the model defining a resource-constrained project scheduling problem as observed after allocating six tasks.

DESCRIPTION OF EMBODIMENTS

Figure 1:
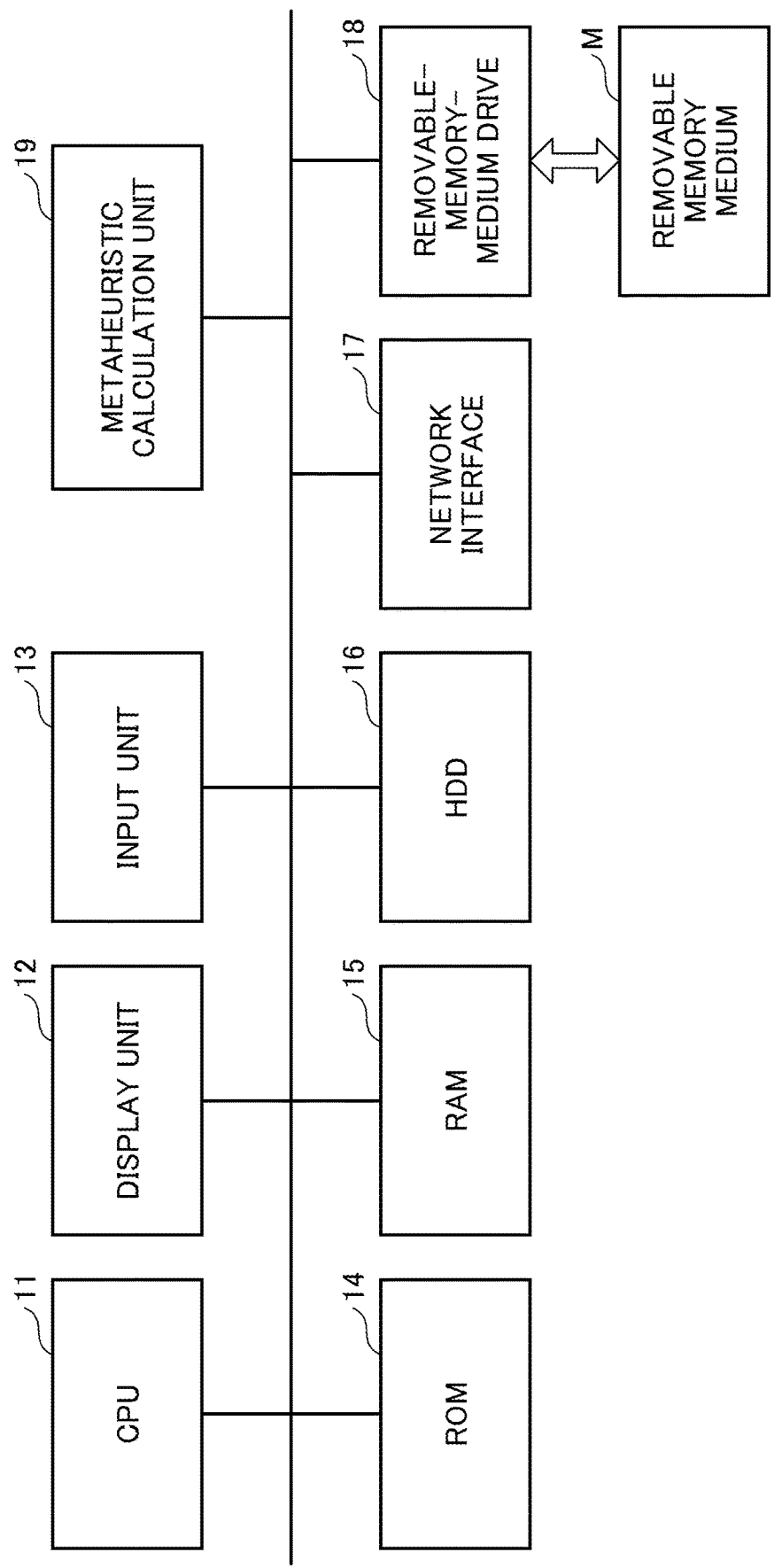
FIG. 1 is a drawing illustrating an example of the hardware configuration of an optimization apparatus for executing an optimization method.

In combinatorial optimization problems such as a resource-constraint project scheduling problem, an increase in the number of dimensions of search space results in an explosive increase in the number of combinations of variables. In such a case, the use of exhaustive search, which calculates all possible combinations, requires lengthy computational time that is practically infeasible. Instead of finding the true optimum solution, thus, a general-purpose approximation algorithm (i.e., metaheuristic algorithm)

based on a heuristic approach may be used, or an approximation algorithm that obtains a good approximate solution within a practically feasible computational time may be used.

A metaheuristic algorithm can obtain an optimum solution or a solution sufficiently close to the optimum solution, if given a sufficiently long computational time, through state transitions starting from an initial state to search for solutions attaining successively smaller values of an objective function. However, a solution that is sufficiently close to the optimal solution is not always readily obtained within a practically feasible computational time.

Examples of an apparatus for performing simulated annealing, which is one type of metaheuristic algorithm, include an Ising machine (i.e., Boltzmann machine) using an Ising energy function. In Ising machine, the problem to be solved is represented as an Ising model using binary variables. In order to allow an Ising machine to obtain an approximate solution by formulating a model representing a resource-constrained project scheduling problem, various constraints regarding a plurality of tasks and a plurality of resources may be incorporated into an objective function, and, then, the objective function may be minimized to obtain a solution. However, there is a problem in an Ising model in that it is difficult to directly formulate a makespan minimization problem.

One type of method for incorporating a makespan minimization problem indirectly into an Ising model is a method of using auxiliary variables represented as binary variables. Namely, n binary variables $y_i$ (i=1 to n) are introduced, for example, and these n binary variables are used to represent a value $C=y_1+2y_2+3y_3+4y_4+ \ldots +ny_n$, for example. Use of an Ising machine to minimize the value of the objective function C while satisfying the constraints "the completion time of all tasks <C" and "only one of $y_i$ is 1" allows an approximate solution to be obtained in a makespan minimization problem. Use of this method, however, entails an increase by n in the number of dimensions of the search space in combinatorial optimization, resulting in a significant decrease in the performance of the Ising model for obtaining a solution.

As an alternative, a makespan minimization problem may be represented by a different problem as an approximation thereto, thereby allowing a solution to be obtained that is approximate to the solution of the makespan minimization problem. For example, the durations of all the individual tasks are added to obtain a sum, and an Ising machine is used to obtain an approximate solution such as to minimize the sum serving as an objective function. It may be noted, however, that the sum may vastly differ, even when the makespans are almost the same, between the case in which all the tasks are completed substantially at the same time and the case in which one task is completed significantly later than the other tasks. As is understood from the above, methods of using a different problem as an approximation to a makespan minimization problem cannot produce a highly accurate approximate solution.

Accordingly, there may be a need for a method of obtaining an approximate solution of a makespan minimization problem with high accuracy in a short time in the resource-constraint project scheduling problem.

In the following, embodiments of the invention will be described with reference to the accompanying drawings.

FIG. 1 is a drawing illustrating an example of the hardware configuration of an optimization apparatus for executing an optimization method. The optimization apparatus illustrated in FIG. 1 includes a CPU 11, a display unit 12, an input unit 13, a ROM 14, a RAM 15, an HDD 16, a network interface 17, a removable-memory-medium drive 18, and a metaheuristic calculation unit 19. The CPU 11 and the metaheuristic calculation unit 19 are arithmetic circuits.

The input unit 13 provides user interface, and receives various commands for operating the optimization apparatus and user responses responding to data requests or the like. The display unit 12 displays the results of processing by the optimization apparatus, and further displays various data that make it possible for a user to communicate with the optimization apparatus. The network interface 17 is used to communicates with peripheral devices and with remote locations.

The optimization apparatus illustrated in FIG. 1 is a computer, and the optimization method is provided as a computer program executable by the optimization apparatus. This computer program is stored in a memory medium M that is mountable to the removable-memory-medium drive 18. The computer program is loaded to the RAM 15 or to the HDD 16 from the memory medium M through the removable-memory-medium drive 18. Alternatively, the computer program may be stored in a memory medium (not shown) provided in a peripheral apparatus or at a remote location, and is loaded to the RAM 15 or to the HDD 16 from the memory medium through the network interface 17.

Upon receiving user instruction for program execution from the input unit 13, the CPU 11 loads the program to the RAM 15 from the memory medium M, the peripheral apparatus, the remote memory medium, or the HDD 16. The CPU 11 executes the program loaded to the RAM 15 by use of an available memory space of the RAM 15 as a work area, and continues processing while communicating with the user as such a need arises. The ROM 14 stores control programs for the purpose of controlling basic operations of the CPU 48 or the like.

By executing the computer program as described above, the optimization apparatus performs the function to obtain an approximate solution to a makespan minimization problem. The metaheuristic calculation unit 19 may be a dedicated hardware specifically designed to execute a metaheuristic algorithm, and may be a dedicated hardware that performs simulated annealing to search for a solution of an Ising problem. In an alternative configuration, the metaheuristic calculation unit 19 may not be provided. In such a case, the CPU 11, which is the processor of a general-purpose computer, functions as a metaheuristic calculation unit to perform a metaheuristic algorithm. The metaheuristic algorithm may be simulated annealing, a random walk search algorithm, a genetic algorithm, a stochastic evolution algorithm, taboo search, or the like. It suffices for a metaheuristic algorithm to search in a heuristic manner for a solution (i.e., approximate solution) approximate to the solution that minimizes an objective function.

Figure 2:
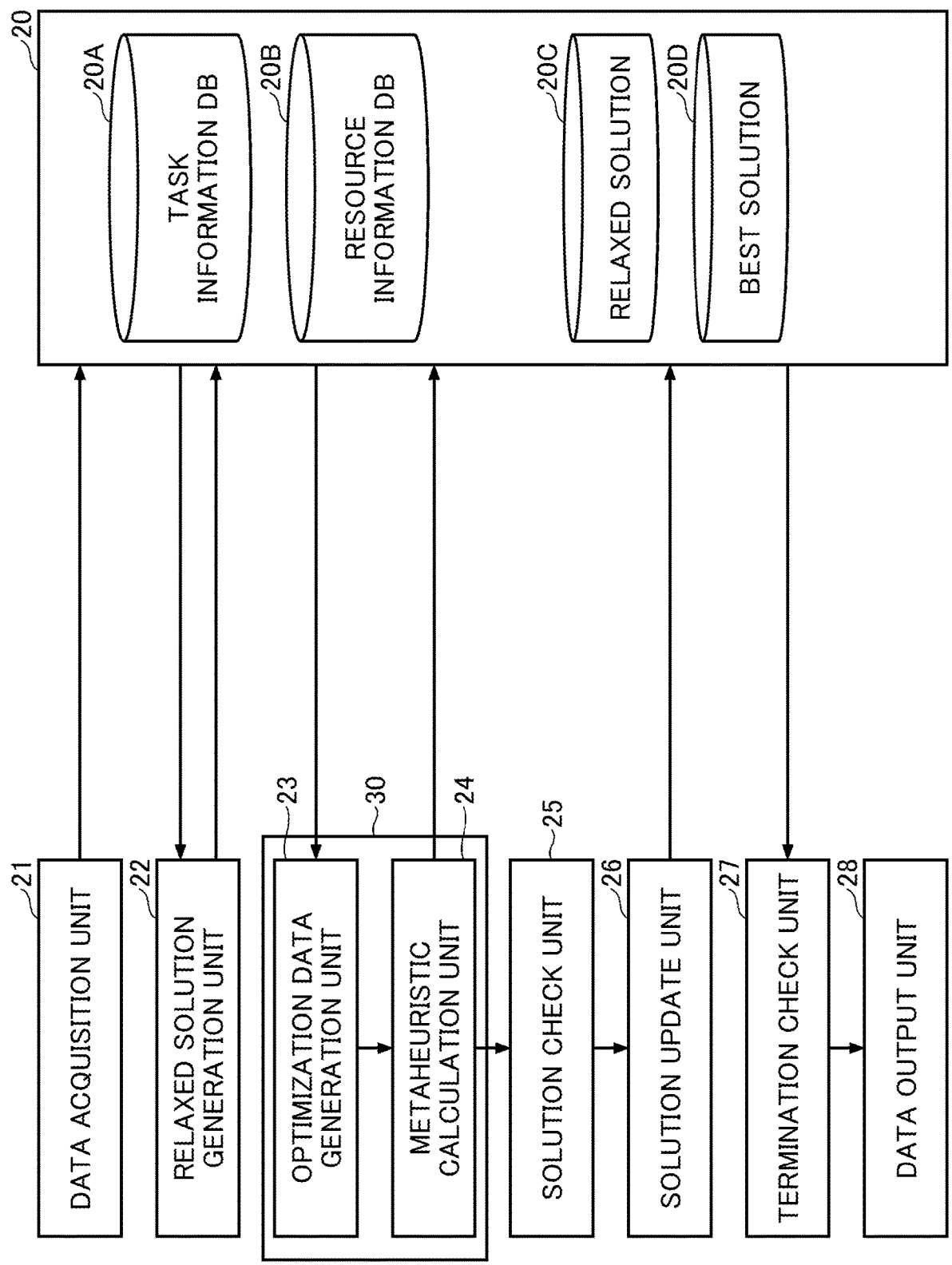
FIG. 2 is a drawing illustrating an example of the functional configuration of the optimization apparatus.

FIG. 2 is a drawing illustrating an example of the functional configuration of the optimization apparatus. The optimization apparatus illustrated in FIG. 2 includes a data storage unit 20, a data acquisition unit 21, a relaxed solution generation unit 22, an optimization data generation unit 23, a metaheuristic calculation unit 24, a solution check unit 25, a solution update unit 26, a termination check unit 27, and a data output unit 28.

The functional units other than the data storage unit 20 and the metaheuristic calculation unit 24 may be implemented by the CPU 11 illustrated in FIG. 1. The function of the data storage unit 20 may be implemented by the RAM 15 or the HDD 16 illustrated in FIG. 1. The function of the metaheuristic calculation unit 24 may be implemented by the CPU 11 or the metaheuristic calculation unit 19 illustrated in FIG. 1.

It may be noted that boundaries between functional blocks illustrated as boxes indicate functional boundaries, and may not necessarily correspond to boundaries between program modules or separation in terms of control logic. One functional block and another functional block may be combined into one functional block that functions as one block. One functional block may be divided into a plurality of functional blocks that operate in coordination.

The data storage unit 20 stores therein a task information database (task information DB) 20A, a resource information database (resource information DB) 20B, relaxed-solution data 20C, and best solution data 20D.

The data acquisition unit 21 stores, in the task information database 20A and the resource information database 20B, data regarding individual tasks and data regarding individual resources that are supplied from an external source to define a resource-constrained project scheduling problem. Data regarding constraints on the individual tasks and the individual resources may also be stored in the task information database 20A and the resource information database 20B.

Figure 3:
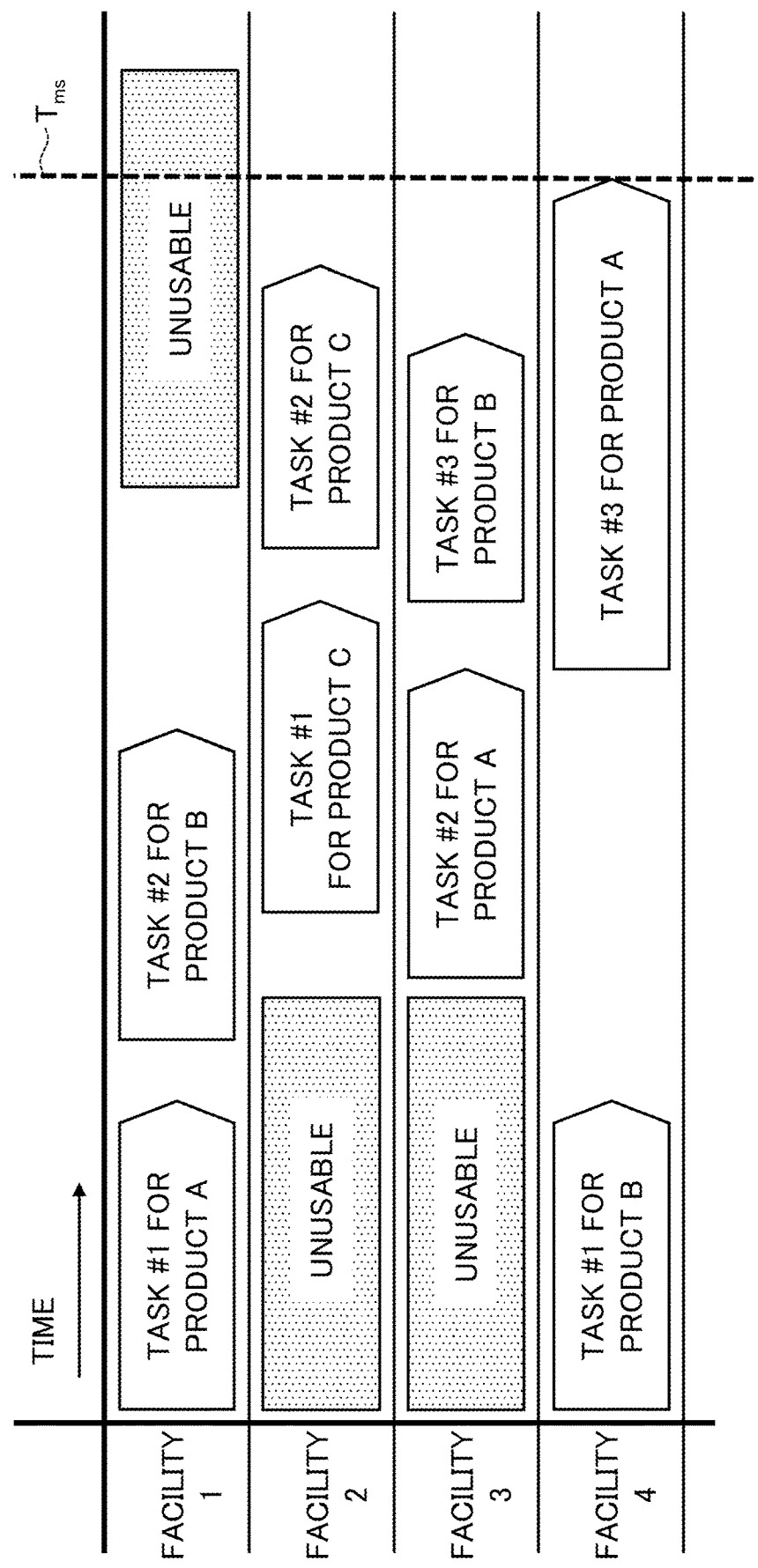
FIG. 3 is a drawing schematically illustrating an example of a resource-constrained project scheduling problem.

FIG. 3 is a drawing schematically illustrating an example of a resource-constrained project scheduling problem. The resource-constrained project scheduling problem illustrated in FIG. 3 is defined such that tasks #1 through #3 for each of the products A and B and tasks #1 and #2 for a product C are allocated to four facilities 1 through 4. A makespan minimization problem in this resource-constrained project scheduling problem is the problem that requires all the tasks to be scheduled such as to make as early as possible a project completion time Tms (i.e., the completion time of the last task completed).

In a resource-constrained project scheduling problem, various constraints may be imposed on a plurality of tasks and a plurality of resources. In the example illustrated in FIG. 3, for example, a time period indicated as "UNUSABLE" refers to the time period in which the indicated facility cannot be used to perform a task. In this manner, constrains may be imposed on resource usable time. Further, as constrains on the order of tasks, constraints may be imposed such that tasks #1, #2, and #3 for a given product may need to be performed in the order named, without overlapping one another in time. Moreover, constraints may be imposed on correspondence between tasks and resources such as the requirement that a particular task can only be performed by a particular resource, and constraints may be imposed on the allowable start time and the required completion time of individual tasks.

Figure 4:
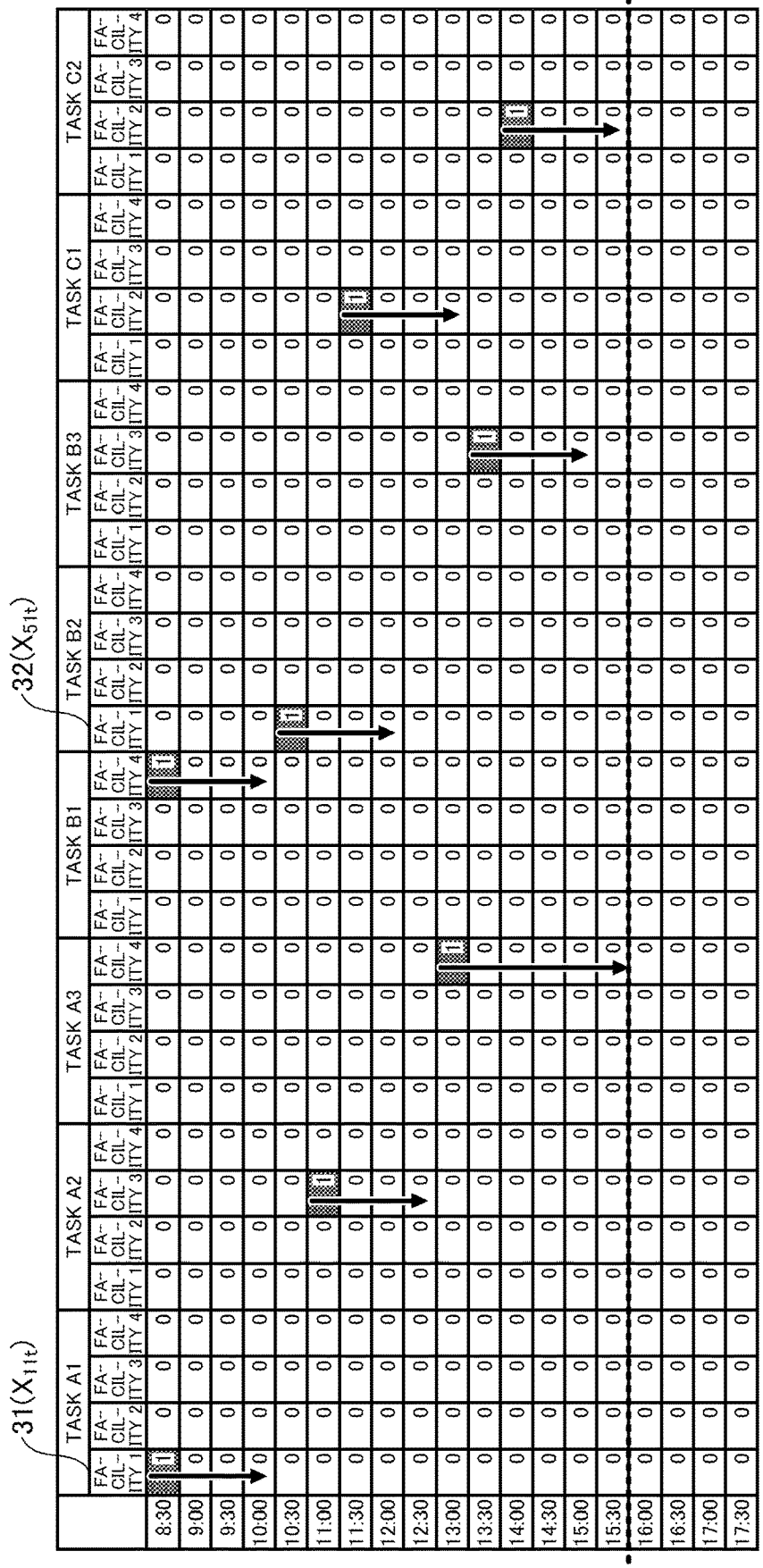
FIG. 4 is a drawing illustrating an example of a binary-variable-based model of the resource-constrained project scheduling problem illustrated in FIG. 3.

FIG. 4 is a drawing illustrating an example of a binary-variable-based model of the resource-constrained project scheduling problem illustrated in FIG. 3. In order for the metaheuristic calculation unit 24 illustrated in FIG. 2 to function as an Ising machine to perform an optimization process formulated as an Ising model, the resource-constrained project scheduling problem is formulated as a binary-variable-based model, on which an optimization process is performed. The binary-variable-based model as illustrated in FIG. 4 is not only applicable to an optimization process performed by an Ising machine, but also applicable to an optimization process performed by a different metaheuristic algorithm.

In order to formulate a binary-variable-based model of the resource-constrained project scheduling problem illustrated in FIG. 3, binary variables $x_{jmt}$ may be defined. Subscript j identifies a task, subscript m identifying a resource, and subscript t identifying a time. For example, the task #1 for the product A is identified by a task j=1, allocation to the facility 1 identified by a resource m=1, and the time 8:30 identified by a time slot number 1. The fact that the value of $x_{jmt}$ becomes 1 for j=1, m=1, and t=1 (namely, $x_{111}$=1) represents the fact that the task #1 for the product A starts at the time 8:30 by use of the facility 1.

Each row of the table illustrated in FIG. 4 represents time (by time slots in units of 30 minutes), and each column represents a combination between a task and a facility. For example, a column 31 shows a value, at a time t, of a variable $x_{11t}$ which defines the fact that the task #1 for the product A is allocated to the facility 1. The task #1 for the product A starts at the time 8:30 by use of the facility 1, so that the value of $x_{11t}$ assumes "1" only in the time slot corresponding to the time 8:30 (i.e., $x_{111}$=1), and assumes "0" in any other time slots.

As the value of a task j, the task #k for the product A may be identified by a task j=k, the task #k for the product B being identified by a task j=3+k, and the task #k for the product C being identified by a task j+6+k. For example, the variable for representing the fact that the task #2 for the product B is allocated to the facility 1 is $x_{51t}$. With this arrangement, the columns illustrated in FIG. 4 correspond, from left to right, to the following variables: $x_{11t}$, $x_{12t}$, $x_{13t}$, $x_{14t}$, $x_{21t}$, $x_{22t}$, $x_{23t}$, $x_{24t}$, $x_{31t}$, $x_{32t}$, $x_{33t}$, $x_{34t}$, $x_{41t}$, $x_{42t}$, $x_{43t}$, $x_{44t}$, $x_{51t}$, $x_{52t}$, $x_{53t}$, . . . , $x_{74t}$, $x_{81t}$, $x_{82t}$, $x_{83t}$, $x_{84t}$. Variable $x_{5t}$ corresponds to the column 32, and assumes a value of "1" only at the time 10:30, which represents the fact that the task #2 for the product B starts at the time 10:30 by use of the facility 1. It may be noted that the time slot corresponding to the time 10:30 is the fifth time slot identified by a time t=5, so that $x_{515}$=1.

The length of time required to complete each task (i.e., the required time) is not defined by the value of variable $x_{jmt}$. Instead, a constant for representing the required time of each task is defined separately. As will be described later, this constant is used to manipulate subscript t, thereby allowing conditions regarding the require time to be specified.

In the following, a description will be given of an example of formulation of a resource-constrained project scheduling problem by using binary variable $x_{jmt}$ described in the above example. In order to formulate a resource-constrained project scheduling problem, an objective function that is to be minimized in an optimization process performed by the metaheuristic calculation unit 24 may be defined by binary variable $x_{jmt}$.

In order to specify various constraints regarding binary variable $x_{jmt}$, the following constants are defined.

$jt_j$: the number of time slots of the required time for task j
$jst_j$: the sequence number of the time slot of the allowable start time for task j
$jdt_j$: the sequence number of the time slot of the completion time for task j
$c_k$: Weight for constraint term Qk Further, the following sets are defined.
J: a set of tasks j
M: a set of resources m
T: a set of time slots subjected to optimization
$MT_m$: a set of time slots allocatable to a resource m ($MT_m \subset T$)
$M\_JOB_m$: a set of tasks executable by a resource m ($M\_JOB_m \subset J$)
PRE: a set of combinations each comprised of a task jp, a task jn, and a waiting time wait (i.e., a set of combinations of tasks and a waiting time for which the start of the task jn occurs at the end of a time wait after the start of the task jp)

Based on these constants and sets, an objective function E is formulated as a weighting sum of constraint terms Qk multiplied by respective weighting factors $c_k$ as follows.

$$E = c_1 Q1 + c_2 Q2 + c_3 Q3 + c_4 Q4 + c_5 Q5 + c_6 Q6 + c_7 Q7$$

$$Q1 = \sum_j \sum_m \sum_{t < jst_j} x_{j,m,t}$$

$$Q2 = \sum_j \sum_m \sum_{t > jdt_j - jt_j} x_{j,m,t}$$

$$Q3 = \sum_j \sum_m \sum_{t \in (MT_m)^c} x_{j,m,t}$$

$$Q4 = \sum_m \sum_{j \in (M\_JOB_m)^c} \sum_t x_{j,m,t}$$

$$Q5 = \sum_j \left( \sum_m \sum_t x_{j,m,t} - 1 \right)^2$$

$$Q6 = \sum_j \sum_m \sum_t \sum_{j'} \sum_{t \leq t' < t + jt_j} x_{j,m,t} x_{j',m,t'}$$

$$Q7 = \sum_{(jp, jn, wait) \in PRE} \sum_m \sum_t \sum_{m'} \sum_{t' \neq t + wait} x_{jp,m,t} x_{jn,m',t'}$$

In each constraint term shown above, the summation symbol Σ regarding time slot t in the case of no summation range being defined means obtaining a sum over the set T of time slots subjected to optimization.

The constraint term Q1 defines the constraint that each task is started at or after the preset start time (wherein the start time of a task j is the time slot sequence number $jst_j$). The sum is obtained of binary variables $x_{jmt}$ satisfying the condition that the start occurs prior to the time slot sequence number $jst_j$, so that the value of the objective function E increases as a penalty when a value of $x_{jmt}$ subjected to the summation becomes 1.

The constraint term Q2 defines the constraint that each task is completed by the preset completion time (wherein the completion time of a task j is the time slot sequence number $jdt_j$). The sum is obtained of binary variables $x_{jmt}$ satisfying the condition that the start occurs after the time slot sequence number $jdt_j - jt_j$ (i.e., completion time−required time=required start time), so that the value of the objective function E increases as a penalty when a value of $x_{jmt}$ subjected to the summation becomes 1.

The constraint term Q3 defines the constraint that a resource is not used during the time outside the resource usable time (i.e., the time belonging to the complement of the set $MT_m$ constituted by time slots allocatable to the resource m). The sum of binary variables $x_{jmt}$ is obtained with respect to the time slot sequence numbers belonging to the complement of the set $MT_m$ constituted by time slots allocatable to the resource m, so that the value of the objective function E increases as a penalty when a value of $x_{jmt}$ subjected to the summation becomes 1.

The constraint term Q4 defines the constraint that only the tasks allocatable to a resource (i.e., tasks belonging to the set $M\_JOB_m$ constituted by tasks executable by a resource m) are allocated to such a resource. The sum of binary variables $x_{jmt}$ is obtained with respect to the tasks belonging to the complement of the set $M\_JOB_m$ constituted by tasks executable by a resource m, so that the value of the objective function E increases as a penalty when a value of $x_{jmt}$ subjected to the summation becomes 1.

The constraint term Q5 defines the constraint that each task is performed only once. The squared term included in the constraint term Q5 is the square of a number obtained by subtracting 1 from the sum that is obtained, with respect to all the resources m and all the time slots t, of binary variables $x_{jmt}$ specifying a particular task j. This squared term becomes 0 when the value of $x_{jmt}$ becomes 1 only once for all the resources m and all the time slots t. In other cases, the squared term assumes a value greater than 0, so that the value of the objective function E increases as a penalty.

The constraint term Q6 defines the constraint that no resource has two or more tasks simultaneously allocated thereto. With respect to a given resource m, variable $x_{jmt}$ assumes a value of 1 when the task j starts at the time slot t, and variable $x_{j'mt'}$ assumes a value of 1 when another task j' starts during a period t' between the time slot t and the end of the required time $jt_j$ of the task j following the time slot t, which results in the product of these two variables becoming 1. With the sum of such products being incorporated into the objective function, allocating two or more tasks simultaneously to a given resource causes the value of the objective function E to increase as a penalty.

The constraint term Q7 defines a constraint on the order of tasks such that a next task jn starts upon waiting for the time "wait" after a preceding task jp. Variable $x_{jpmt}$ assumes a value of 1 when the task jp starts at the time slot t by using the resource m, and variable $x_{jnm't'}$ assumes a value of 1 when the task jn starts at the time slot t' (=t+wait) equal to the end of the time "wait" following the time slot t by using the resource m', which results in the product of these two variables becoming 1. The value of such a product satisfying the above-noted condition is not incorporated as a penalty, but the sum of such products corresponding to other conditions is incorporated into the objective function. With this arrangement, the value of the objective function E increases when the constraints on the order of tasks are violated.

When simulated annealing, for example, is used to obtain an approximate solution to the resource-constrained project scheduling problem formulated into the above-described model, a state S having binary variables $x_{jmt}$ as described above may be defined. An objective function value E of the current state S is calculated, and, then, an objective function value E' of the next state S' obtained by making a slight change (e.g., 1-bit inversion) from the current state S is calculated, followed by calculating a difference ΔE (=E'−E) between these two states. In the case in which the Boltzmann distribution is used to represent the probability distribution of S and the Metropolis method is used, for example, probability P with which a transition to the next state S' occurs may be defined by the following formula.

$$P = \min[1, \exp(-\beta \Delta E)]$$

Here, β is thermodynamic beta (i.e., the reciprocal of absolute temperature). The function min[1, x] assumes a value of 1 or a value of x, whichever is smaller. According to the above formula, a transition to the next state occurs with probability "1" in the case of ΔE≤0, and a transition to the next state occurs with probability exp(−βΔE) in the case of 0<ΔE.

Lowering temperature at a sufficiently slow rate, while performing state transitions, allows the state to be converged, theoretically, on an optimum solution having the smallest objective function value. The Metropolis method is a non-limiting example, and other transition control algorithms such as Gibbs sampling may alternatively be used.

In the manner described above, the resource-constrained project scheduling problem is formulated into a binary-variable-based model. The task information database 20A and the resource information database 20B stored in the data storage unit 20 illustrated in FIG. 2 may include data indicative of variables $x_{jmt}$, the constants, the sets, the objective function, and the like for defining the model as described above.

Referring to FIG. 2 again, the relaxed solution generation unit 22 generates a relaxed solution, i.e., a solution violating a constraint, based on the data indicative of tasks, the data indicative of resources, and the data indicative of constraints stored in the task information database 20A and the resource information database 20B. The solution violating a constraint refers to a solution that does not satisfy at least part of the constraints imposed on the tasks and the resources. Such a solution is situated outside the search space satisfying the constraints, and is situated within a search space satisfying at least partially relaxed constraints. In the present application, the term "relaxed solution" and the term "solution violating a constraint" are used to refer to the same meaning.

The data indicative of a relaxed solution generated by the relaxed solution generation unit 22 is stored as relaxed-solution data 20C in the data storage unit 20. The relaxed-solution data 20C includes at least the data indicative of the finish time of a relaxed solution, i.e., the data indicative of the finish time of the task that is completed last among the tasks constituting the relaxed solution.

As an opposite to the solution violating a constraint, a solution satisfying constraints is further defined as a solution satisfying the conditions. The solution satisfying constraints may be a solution that satisfies all the constraints defined in an objective function while the solution violating a constraint may be a solution that does not satisfy part of the constraints defined in the objective function. As will be described later, data indicative of a solution satisfying constraints obtained by the metaheuristic calculation unit 24 is stored as best solution data 20D in the data storage unit 20. In the present application, the term "solution satisfying constraints" and the term "best solution" are used to refer to the same meaning. The best solution data 20D includes at least the data indicative of the finish time of a solution satisfying constraints, i.e., the data indicative of the finish time of the task that is completed last among the tasks constituting the solution satisfying constraints.

It may be noted that when the solution satisfying constraints is defined as a solution that satisfies all the constraints defined in an objective function as described above, the case of the objective function E previously described requires that the solution satisfying constraints is the solution for which the value of the objective function E becomes the smallest value "zero". Alternatively, a solution that satisfies part of the constraints (e.g., some constraint terms among the constraint terms Q1 through Q7 previously described) may be defined as a solution satisfying constraints while a solution not satisfying such a part of the constraints may be defined as a solution violating a constraint. In this case, such a part of the constraints that should be satisfied by a solution satisfying constraints may be constraints that need to be satisfied or that are important, and may be defined in accordance with the configuration of the problem. For example, the condition that each task is performed only once and the condition that a resource is not used outside the usable time may be important. In such a case, a solution satisfying these two conditions (i.e., Q3=Q5=0) may be treated as a solution satisfying constraints while a solution not satisfying these conditions may be treated as a solution violating a constraint.

The relaxed solution generation unit 22 may generate a relaxed solution based on a metaheuristic algorithm. In so doing, a weighing factor $c_k$ may be set to zero with respect to one or more constraint terms that are part of the constraint terms Qk included in the objective function E previously described, for example, and that define one or more conditions other than part of the constraints (e.g., the constraint term Q5 requiring each task to be performed only once). An approximate solution may then be obtained by minimizing the objective function. With this arrangement, a solution violating a constraint may be obtained for which the constraint term Q3, for example, requiring a resource to be not used outside the resource usable time assumes a value greater than zero (i.e., the resource is used during the resource unusable time).

The relaxed solution generation unit 22 may generate a relaxed solution by use of a deterministic algorithm, rather than by use of a metaheuristic algorithm. A metaheuristic algorithm, in general, is designed such that a probabilistic factor is used to gradually decrease an objective function value while satisfying constraints without being trapped at an unfavorable local solution, thereby generating a satisfactory solution. It suffices for the relaxed solution generation unit 22 to generate a solution without any regard to the constraints. A deterministic algorithm that ignores the constraints may thus readily generate a relaxed solution. Use of a deterministic algorithm allows an initial value of a relaxed solution to be easily obtained in an efficient manner.

Based on the data stored in the data storage unit 20, the optimization data generation unit 23 generates input data used in an optimization process performed by the metaheuristic calculation unit 24. The input data generated by the optimization data generation unit 23 includes the end time of a target optimization period which is used in the optimization process performed by the metaheuristic calculation unit 24. The end time of a target optimization period is equal to the sequence number of the last time slot belonging to the set T of time slots subjected to the optimization process, which is one of the constants described in connection with the model formulation of a resource-constrained project scheduling problem previously described. This time is obtained based on the relaxed-solution data 20C and the best solution data 20D as will be described later. Specifically, the end time of a target optimization period is set between the finish time of a relaxed solution indicated by the relaxed-solution data 20C and the finish time of a best solution indicated by the best solution data 20D.

Figure 5:
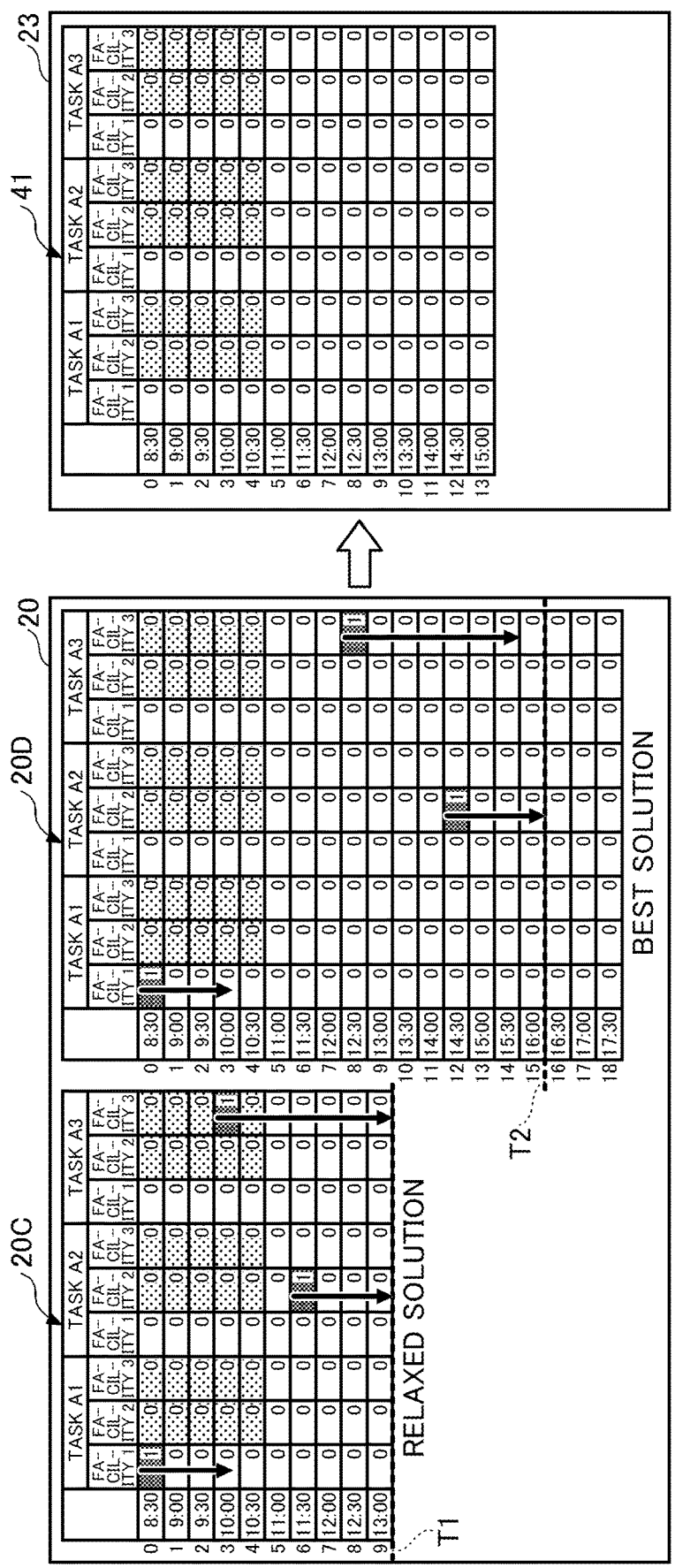
FIG. 5 is a drawing illustrating an example of input data that is used in an optimization process and that is generated based on a relaxed solution and a best solution.

FIG. 5 is a drawing illustrating an example of input data that is used in an optimization process and that is generated based on a relaxed solution and a best solution. In FIG. 5, for the sake of convenience of explanation, only the data indicative of the tasks #1 through #3 for the product A (i.e., the tasks A1 through A3) are illustrated, and the relaxed-solution data 20C and the best solution data 20D are stored in the data storage unit 20.

The relaxed-solution data 20C specifies the state of a relaxed solution based on the model using binary variables $x_{jmt}$ previously described. Likewise, the best solution data 20D specifies the state of a best solution based on the model using binary variables $x_{jmt}$. In FIG. 5, the arrays of values of variables $x_{jmt}$ are illustrated by using a table format similar to that of FIG. 4 for the purpose of allowing the state of solutions to be visually recognized. In the tables illustrating the relaxed-solution data 20C and the best solution data 20D, the time periods highlighted in dot shading indicate the periods during which the indicated resources cannot be used.

In the example illustrated in FIG. 5, a distinction between the solution satisfying constraints and the solution violating a constraint is made according to whether the constraint term Q3 previously described is satisfied, i.e., whether the indicated resources are used only during the resource usable time. In the table of the relaxed solution illustrated in FIG. 5, the time at which the task A3 (i.e., the task #3 for the product A) is started by using the facility 3 is 10:00 at which the facility 3 cannot be used. Namely, this relaxed solution is a solution violating a constraint for which the constraint term Q3 previously described has a value greater than zero (i.e., the resource is used during the resource unusable time). In the table of the best solution, scheduled tasks do not include any task that is performed during the resource unusable time, so that this solution satisfies the constraint represented by the constraint term Q3. Namely, this best solution is a solution satisfying constraints for which the constraint term Q3 previously described has a value of zero (i.e., the resource is used only during the resource usable time).

In FIG. 5, the finish time of the task that is completed last among the tasks included in the relaxed solution is the finish time T1 of the relaxed solution. Further, the finish time of the task that is completed last among the tasks included in the best solution is the finish time T2 of the best solution. In this example, the time slot sequence number of the finish time T1 is 9, and the time slot sequence number of the finish time T2 is 15.

As illustrated in FIG. 5, the optimization data generation unit 23 generates input data 41 for an optimization process based on the relaxed-solution data 20C and the best solution data 20D stored in the data storage unit 20. The input data 41 represents tasks, facilities, and time slots subjected to an optimization process based on the model using binary variables $x_{jmt}$. The input data 41 defines the configuration of a problem in which scheduling is made to allocate tasks to facilities at particular time slots. In FIG. 5, the arrays of values of variables $x_{jmt}$ are illustrated by using a table format similar to that of FIG. 4 for the purpose of allowing the state of variables to be visually recognized. The input data 41 defines that an optimization process is to be performed such that three tasks are allocated to three facilities between the time slot sequence number 0 at 8:30 and the time slot sequence number 13 at 15:00. It may be noted that the set T of time slots subjected to an optimization process, as previously described, accordingly includes, as elements of the set, the time slots from 8:30 to 15:00.

The optimization data generation unit 23 generates the input data 41 such that the time of the last time slot of the input data 41 (i.e., the end time of a target optimization period) is situated between the finish time T1 of the relaxed solution and the finish time T2 of the best solution described above. In so doing, the interval between the finish time T1 and the finish time T2 may be divided with a predetermined ratio (e.g., 1:1), so that the end time of a target optimization period is set at the point of the divide. Setting the end time of a target optimization period according to a predetermined ratio allows a simple process to generate the input data 41 in an efficient manner. Based on the input data 41 generated as described above, the metaheuristic calculation unit 24 performs an optimization process as will be described below.

By referring to FIG. 2 again, the metaheuristic calculation unit 24 performs a heuristic optimization process based on the data configured by the optimization data generation unit 23, thereby generating an approximate solution that minimizes the value of a designed objective function. In performing an optimization process, tasks are scheduled such that the finish time of any given task is no later than the end time of a target optimization period set by the optimization data generation unit 23. Namely, when the end time of a target optimization period is set to the time slot at 15:00, for example, the optimization process evaluates only those schedules in which all the tasks are completed before or at the time slot of 15:00. This is achieved by setting the last time slot of the set T of time slots subjected to an optimization process to the end time of a target optimization period. An approximate solution generated by the metaheuristic calculation unit 24 may sometimes be a solution violating a constraint and may sometimes be a solution satisfying constraints, depending on various conditions including the end time of a target optimization period.

A solution violating a constraint or a solution satisfying constraints generated by the metaheuristic calculation unit 24 are used by the solution update unit 26 to update the relaxed-solution data 20C or the best solution data 20D, as will be described later in detail. Specifically, the solution update unit 26 replaces the relaxed-solution data 20C with the data indicative of a solution violating a constraint upon the occurrence of a solution violating a constraint, and replaces the best solution data 20D with the data indicative of a solution satisfying constraints upon the occurrence of a solution satisfying constraints. In this manner, the calculation of an approximate solution by the optimization process of the metaheuristic calculation unit 24 and the updating of the relaxed-solution data 20C and the best solution data 20D by the solution update unit 26 are repeatedly performed, thereby successively updating solutions.

In the following, the updating of solutions described above will be described in more detail.

The optimization data generation unit 23 and the metaheuristic calculation unit 24 function as an optimization process unit 30. The optimization process unit 30 performs an optimization process in a resource-constrained project scheduling problem to generate an approximate solution based on the task information database 20A, the resource information database 20B, relaxed-solution data 20C, and the best solution data 20D. Specifically, the optimization process unit 30 sets the end time of a target optimization period at a point between the first finish time that is the finish time of a preceding solution violating a constraint and the second finish time that is the finish time of a preceding solution satisfying constraints, followed by obtaining an approximate solution by use of a metaheuristic algorithm. Namely, the optimization process unit 30 sets the end time of a target optimization period at a point between the finish time (i.e., the first finish time) of a solution indicated by the latest relaxed-solution data 20C and the finish time (i.e., the second finish time) of a solution indicated by the latest best solution data 20D, followed by obtaining an approximate solution by use of a metaheuristic algorithm.

Here, the term "approximate solution" refers to a solution that does not guarantee the occurrence of the minimum value of an objective function for optimization, and that can be regarded as a proper approximation to the optimum solution minimizing the objective function. In order for the optimization process unit 30 to obtain an approximate solution, the optimization process makes successive state transitions in the search space such as to stochastically decrease the value of the objective function. Upon making transitions a predetermined number of times determined in advance, the state observed at that instance may be output as an approximate solution. Alternatively, the optimization process unit 30 may perform the optimization process for a predetermined duration determined in advance, and, then, may output the state observed at that instance as an approximate solution. Alternatively, the optimization process unit 30 may detect the event in which the value of an optimization process becomes lower than or equal to a predetermined value determined in advance, and, then, may output the state observed at that instance as an approximate solution.

When the optimization process performed based on the finish time of the relaxed-solution data 20C and the finish time of the best solution data 20D is performed for the first time, respective initial value data are used as the finish time of the relaxed-solution data 20C and the finish time of the best solution data 20D. An initial value serving as the first relaxed-solution data 20C is the relaxed-solution data 20C generated by the relaxed solution generation unit 22 as previously described.

In order to provide an initial value for the best solution data 20D, the optimization process unit 30 may generate a solution satisfying constraints. When providing an initial value for the best solution, the end time of a target optimization period may be set to a sufficiently large value (i.e., a sufficiently late point in time) that is feasible and sensible from the viewpoint of making a time schedule for tasks. In the optimization process, further, weighting factors for relevant constraints included in an objective function for optimization may be set to sufficiently large values, thereby ensuring that a solution satisfying constraints is sure to be obtained. Alternatively, the solution search space used in the optimization process may be limited to the space that satisfies constraints, so that state transitions made in the optimization process may be allowed only when the next state satisfy the constraints. Data indicative of the solution satisfying constraints generated first by the optimization process unit 30 is stored as the initial value data of the best solution data 20D in the data storage unit 20.

When the optimization process unit 30 generates an approximate solution as part of the solution updating process, the solution check unit 25 determines whether the approximate solution generated by the optimization process unit 30 is a solution violating a constraint or a solution satisfying constraints. In doing so, the solution check unit 25 may determine that a solution satisfying all the constraints (e.g., all the constraint terms Q1 through Q7 previously described) is a solution satisfying constraints, and may determine that a solution not satisfying at least some of the constraints is a solution violating a constraint. Alternatively, the solution check unit 25 may determine that an approximate solution satisfying predetermined constraints among a plurality of constraints is a solution satisfying constraints, and may determine that an approximate solution not satisfying these predetermined constraints is a solution violating a constraint. More specifically, the solution check unit 25 may determine that a solution satisfying predetermined constraint terms among the constraint terms Q1 through Q7 previously described is a solution satisfying constraints, and may determine that a solution not satisfying at least some of these predetermined constraint terms is a solution violating a constraint.

Determining the type of solution in response to whether predetermined constraints are satisfied or not achieves proper solution determination that is responsive to the configuration of a problem and that reflects the importance or the like of individual constraints, thereby achieving an efficient solution search process for a makespan minimization problem. In general, when the end time of a target optimization period set by the optimization data generation unit 23 is early, an obtained approximate solution is likely to be a solution violating a constraint. When the end time of a target optimization period set by the optimization data generation unit 23 is late, an obtained approximate solution is likely to be a solution satisfying constraints.

Based on the determination made by the solution check unit 25, the solution update unit 26 updates the first finish time by using the finish time of the approximate solution when the approximate solution is a solution violating a constraint, and updates the second finish time by using the finish time of the approximate solution when the approximate solution is a solution satisfying constraints. Namely, in the case in which the approximate solution generated by the optimization process unit 30 is a solution violating a constraint, data of the approximate solution is used to update (i.e., replaces) the relaxed-solution data 20C (including the data indicative of the finish time of a solution) stored in the data storage unit 20. Further, in the case in which the approximate solution generated by the optimization process unit 30 is a solution satisfying constraints, data of the approximate solution is used to update (i.e., replaces) the best solution data 20D (including the data indicative of the finish time of a solution) stored in the data storage unit 20.

Figure 6:
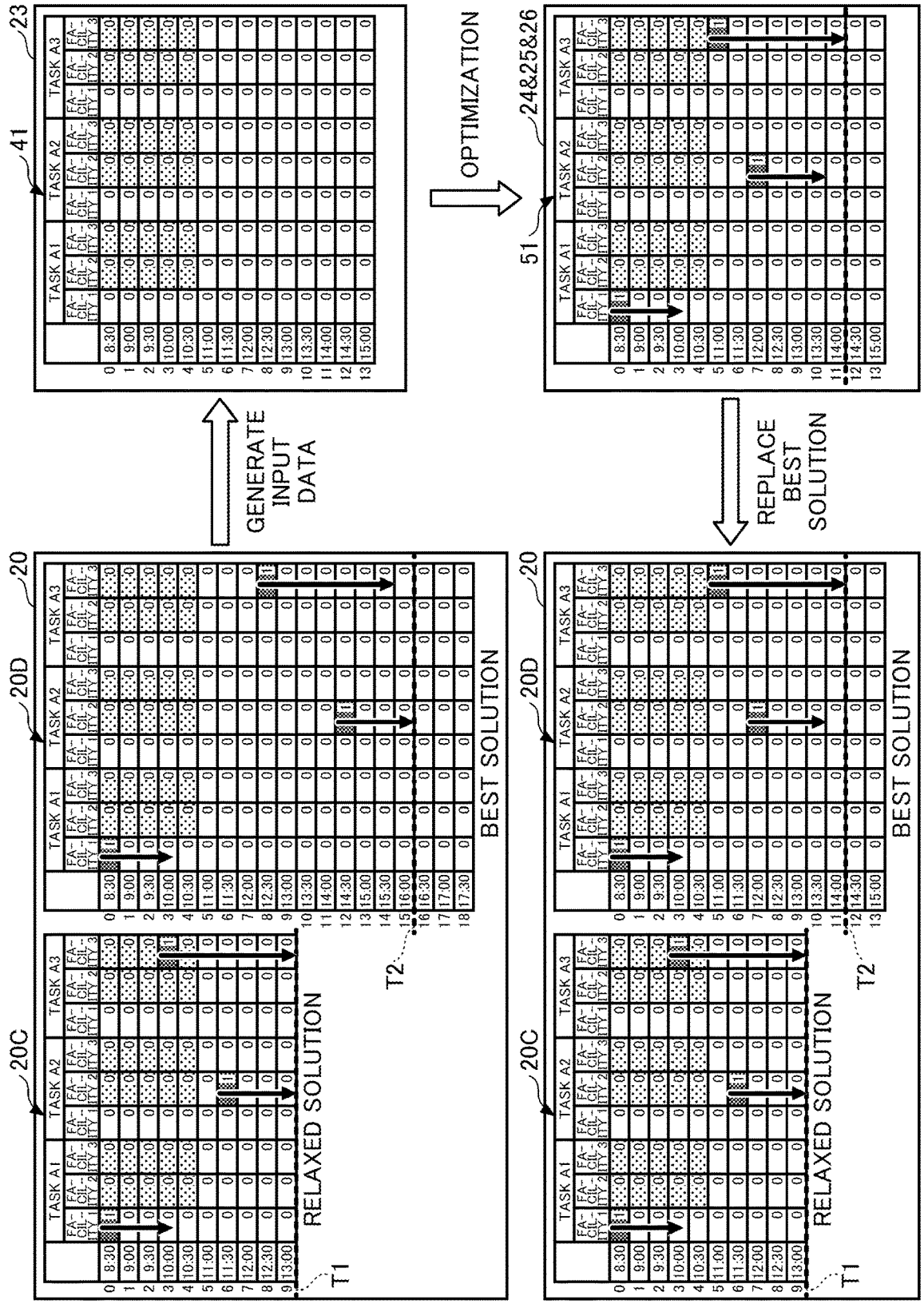
FIG. 6 is a drawing illustrating the updating of either one of relaxed-solution data and best solution data by use of data indicative of a generated approximate solution.

FIG. 6 is a drawing illustrating the updating of either one of relaxed-solution data and best solution data by use of data indicative of a generated approximate solution. In FIG. 6, the same or corresponding elements as those of FIG. 5 are referred to by the same or corresponding numerals, and a description thereof will be omitted as appropriate.

Based on the input data 41 generated by the optimization data generation unit 23 as described in connection with FIG. 5, the metaheuristic calculation unit 24 performs an optimization process to generate an approximate solution. In the example illustrated in FIG. 6, an approximate solution 51 obtained by the metaheuristic calculation unit 24 indicates that all the tasks are performed during the resource usable time. In this case, the solution check unit 25 may determine that the obtained approximate solution 51 is a solution satisfying constraints (i.e., best solution).

Based on this determination, the solution update unit 26 replaces the best solution data 20D stored in the data storage unit 20 with the data indicative of the obtained approximate solution 51. In the example illustrated in FIG. 6, the best solution data 20D in the data storage unit 20 is updated, so that the finish time T2 of the best solution is changed from the time slot sequence number 15 to the time slot sequence number 11.

As described above, the optimization apparatus illustrated in FIG. 2 successively updates the finish time (i.e., the first finish time) of a solution indicated by the relaxed-solution data 20C and the finish time (i.e., the second finish time) of a solution indicated by the best solution data 20D, and causes the metaheuristic calculation unit 24 to produce an approximate solution repeatedly while performing such updating. Through this process, the finish time (i.e., the first finish time) of a solution indicated by the relaxed-solution data 20C and the finish time (i.e., the second finish time) of a solution indicated by the best solution data 20D gradually approach each other.

The termination check unit 27 checks whether a difference between the finish time (i.e., the first finish time) of a solution indicated by the relaxed-solution data 20C and the finish time (i.e., the second finish time) of a solution indicated by the best solution data 20D becomes less than or equal to a predetermined value. When the difference in time becomes less than or equal to the predetermined value, i.e., when the first finish time and the second finish time become sufficiently close to each other or equal to each other, the termination check unit 27 terminates the process of obtaining a solution approximate to the makespan minimum solution performed by the optimization apparatus. The solution indicated by the best solution data 20D at the time the two finish times become equal or substantially equal to each other is consequently a proper approximate solution for the makespan minimum solution. Alternatively, the termination check unit 27 may check whether a difference between the second finish time and the end time of a target optimization period becomes less than or equal to a predetermined value, and may terminate the process of obtaining a solution approximate to the makespan minimum solution based on such a check result.

In the following, a further description will be given of the operation in which the first finish time and the second finish time approach each other as described above.

The first finish time is denoted as T1, and the second finish time is denoted as T2, with the makespan minimum solution (i.e., ideal solution) being denoted as $T_{IDEAL}$. T1 is equal to the finish time of a solution when it is not possible (or is difficult) to obtain a solution satisfying constraints. T2 is equal to the finish time of a solution when a solution satisfying constraints is successfully obtained. The condition of T1<T2 is thus satisfied with high probability. With the end time of a target optimization period being denoted as $T_{END}$, the condition of $T_{END}$<T2 is satisfied because $T_{END}$ is set between T1 and T2. The finish time of an approximate solution to update T2 is always earlier than $T_{END}$, so that T2 is always updated to an earlier time whenever it is updated. Accordingly, T2 monotonously decreases (i.e., gradually moves to earlier time with certainty). The makespan minimum solution is the solution that has the earliest finish time among all the possible solutions satisfying constraints, so that the condition of $T_{IDEAL} \leq T2$ is satisfied. Since T2 is selected from the finish times of all the solutions satisfying constraints such as to monotonously decrease, T2 approaches $T_{IDEAL}$ promptly with certainty. When T2 becomes substantially equal to T1, the value of T2 is consequently a highly accurate approximate value for $T_{IDEAL}$.

It may be noted that the case in which a later one of T1 and T2 is T1, i.e., T2<T1, can occur with low probability. Even in consideration of such a case, $T_{END}$ is always earlier than $T_{LATTER}$ that is a later one of T1 and T2. Namely, the condition of $T_{END}$<$T_{LATTER}$ is satisfied. The finish time of an approximate solution to update T1 and T2 is always earlier than $T_{END}$, so that $T_{LATTER}$ is always updated to an earlier time whenever it is updated. Accordingly, a greater one (i.e., later one) of T1 and T2 monotonously decreases (i.e., gradually moves to earlier time with certainty). Namely, T2 also monotonously decreases with high probability. As is understood from the above, even when taking into account the case in which T2<T1 occurs with some probability, T2 approaches $T_{IDEAL}$ promptly with substantial certainty similarly to the manner previously described. When T2 becomes substantially equal to T1, the value of T2 is consequently a highly accurate approximate value for $T_{IDEAL}$.

The data output unit 28 outputs data indicative of a solution that is obtained in the manner described above and that is approximate to the makespan minimum solution. The output data may be supplied to a display screen via the display unit 12 illustrated in FIG. 1, to the HDD 16, to the memory medium M via the removable-memory-medium drive 18, or to an external device via the network interface 17.

As described above, the optimization apparatus illustrated in FIG. 2 successively updates the finish time of a solution indicated by the relaxed-solution data 20C and the finish time of a solution indicated by the best solution data 20D, and causes a metaheuristic optimization process to produce an approximate solution repeatedly while performing such updating. As a feature of this optimization apparatus, the objective function subjected to minimization in the metaheuristic optimization process does not include a term whose value decreases as the makespan (i.e., the project completion time) becomes earlier and earlier.

It is difficult to incorporate an index for evaluating a makespan directly into an objective function. Because of this, a makespan evaluation index in the related art is incorporated indirectly, or as an approximation, into an objective function, followed by performing a metaheuristic optimization process to obtain a solution approximate to the makespan minimum solution. In contrast, the optimization apparatus illustrated in FIG. 2 does not use a makespan evaluation index incorporated indirectly, or as an approximation, into the objective function. In the optimization process for one round of repeated process, thus, no mechanism whatsoever for decreasing a makespan is incorporated.

For one round of a metaheuristic optimization process, the optimization apparatus illustrated in FIG. 2 does not evaluate a makespan, and obtains an approximate solution for a given end time of a target optimization period which minimizes the objective function that defines constraints. Then, based on the approximate solution obtained by the current-round optimization process, the end time of a target optimization period is shifted in the direction where a solution approximate to the makespan minimum solution is situated or is likely situated, and, then, a next-round optimization process is performed with respect to the shifted end time of a target optimization period. The shifting and updating of an end time of a target optimization period as described above allows an approximate solution obtained by an optimization process to move closer to a solution approximate to the makespan minimum solution.

As described above, the optimization apparatus illustrated in FIG. 2 does not need to incorporate a makespan evaluation index for a resource-constrained project scheduling problem indirectly, or as an approximation, into the objective function, thereby avoiding the lowering of efficiency of a metaheuristic optimization process and the lowering of accuracy of a solution. Further, the end time of a target optimization period is shifted by the procedure similar to binary search. When the total number of time slots is N, therefore, performing an optimization process a number of times approximately equal to $\log_2 N$ enables the obtainment of a proper approximate solution for makespan minimization.

Figure 7:
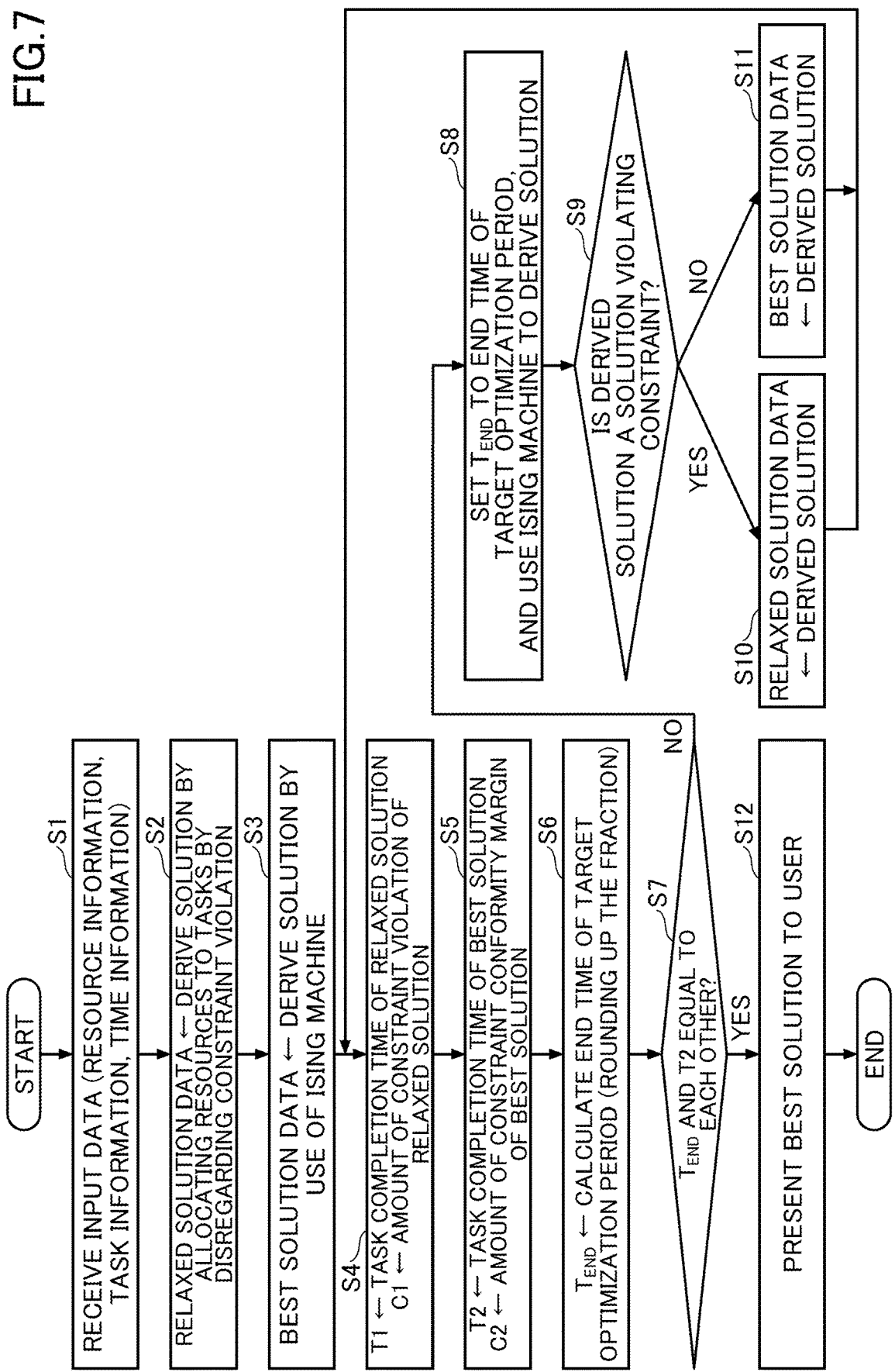
FIG. 7 is a flowchart illustrating an example of the procedure of an approximation method.

FIG. 7 is a flowchart illustrating an example of the procedure of an approximation method. The approximation method illustrated in FIG. 7 may be performed by the function units illustrated in FIG. 2 by use of the hardware illustrated in FIG. 1.

It may be noted that, in FIG. 7 and the subsequent flowcharts, an order in which the steps illustrated in the flowchart are performed is only an example. The scope of the disclosed technology is not limited to the disclosed order. For example, a description may explain that an A step is performed before a B step is performed. Despite such a description, it may be physically and logically possible to perform the B step before the A step while it is possible to perform the A step before the B step. In such a case, all the consequences that affect the outcomes of the flowchart may be the same regardless of which step is performed first. It then follows that, for the purposes of the disclosed technology, it is apparent that the B step can be performed before the A step is performed. Despite the explanation that the A step is performed before the B step, such a description is not intended to place the obvious case as described above outside the scope of the disclosed technology. Such an obvious case inevitably falls within the scope of the technology intended by this disclosure.

In step S1, the data acquisition unit 21 receives input data inclusive of resource information, task information, time information, and the like. The data received by the data acquisition unit 21 is stored in the data storage unit 20.

In step S2, the relaxed solution generation unit 22 derives a solution by allocating resources to tasks by disregarding constraint violation, followed by storing data indicative of the derived solution as the relaxed-solution data 20C in the data storage unit 20. In so doing, the relaxed solution generation unit 22 may use a deterministic algorithm to allocate resources to tasks.

In step S3, the metaheuristic calculation unit 24 derives a solution satisfying constraints by use of an Ising machine, for example, followed by storing data indicative of the derived solution as the best solution data 20D in the data storage unit 20.

In step S4, the optimization data generation unit 23 sets the finish time T1 to the task completion time of a solution indicated by the relaxed-solution data 20C, and sets C1 to the amount of constraint violation of the solution indicated by the relaxed-solution data 20C. Here, the amount of constraint violation is a value indicative of the degree to which a solution violating a constraint violates constraints. In the optimization method illustrated in FIG. 7, the end time of a target optimization period is not set at the point in time at which the interval between the first finish time and the second finish time is divided with a predetermined ratio, but is set based on the amount of constraint violation and the amount of constraint conformity margin, which will be described later.

The amount of constraint violation may be the total number of time slots at which constraint is violated by the combination of a task and a resource (i.e., facility) in a relaxed solution, for example. Specifically, the constraint requiring that a task is allocated to a resource only during the resource usable time may be taken into consideration, for example. Then, the number of time slots at which such a constraint is violated by allocation is used as the amount of constraint violation. In the case of the relaxed solution indicated by the relaxed-solution data 20C illustrated in FIG. 5, for example, the task A3 is allocated to the facility 3 at the time slot sequence numbers "3" and "4" (i.e., 10:00 and 10:30)) which are resource unusable time. In the case of this relaxed-solution data, thus, the amount of constraint violation may be 2.

In step S5, the optimization data generation unit 23 sets the finish time T2 to the task completion time of a solution indicated by the best solution data 20D, and sets C2 to the amount of constraint conformity margin of the solution indicated by the best solution data 20D. Here, the amount of constraint conformity margin is a value indicative of the degree to how much margin exists for a solution satisfying constraints to satisfy constraints.

The amount of constraint conformity margin may be the total number of time slots that are unallocated and usable in a best solution and that are counted over all the resources, for example. Specifically, the number of time slots that are unallocated and usable outside the resource unusable time may be obtained for each resource, and such numbers of time slots may be summed over all the resources. In the case of the best solution indicated by the best solution data 20D illustrated in FIG. 5, for example, the number of time slots unallocated and usable for the facility 1 is 15. Further, the number of time slots unallocated and usable for the facility 2 is 10, and the number of time slots unallocated and usable for the facility 3 is 7. In the case of this best solution data, thus, the amount of constraint conformity margin may be 32=15+10+7.

In step S6, the optimization data generation unit 23 calculates the end time of a target optimization period based on the amount C1 of constraint violation and the amount C2 of constraint conformity margin, and rounds up the fraction as appropriate, followed by setting $T_{END}$ to the obtained end time of a target optimization period. For example, the end time of a target optimization period may be set at a point in time that divides the interval between the first finish time T1 and the second finish time T2 according to the ratio corresponding to the amount C1 of constraint violation of a relaxed solution (i.e., an initial value or a preceding solution violating a constraint) and the amount C2 of constraint conformity margin of a best solution (i.e., an initial value of a preceding solution satisfying constraints).

More specifically, the end time $T_{END}$ of a target optimization period may be calculated by use of the following formula, for example.

$$T_{END}=T1+(T2-T1)C1/(C1+C2)$$

Calculating the end time of a target optimization period in this manner allows the end time of a target optimization period to be set to a relatively late time (i.e., the time closer to T2 than to T1) when the amount C1 of constraint violation is relatively large, i.e., when the finish time T1 of a relaxed solution is situated at too early a time. Further, the end time of a target optimization period is set to a relatively early time (i.e., the time closer to T1 than to T2) when the amount C2 of constraint conformity margin is relatively large, i.e., when the finish time T2 of a best solution is so late as to provide a sufficient margin.

Alternatively, the end time $T_{END}$ of a target optimization period may be calculated by use of the following formula, for example.

$$T_{END}=T1+(T2-T1)(1/3) \text{ (when } C1<C2)$$

$$T_{END}=T1+(T2-T1)(1/2) \text{ (when } C1=C2)$$

$$T_{END}=T1+(T2-T1)(2/3) \text{ (when } C1>C2)$$

In this case, the end time of a target optimization period is set to a point in time that divides the interval between T1 and T2 according to the ratio which is based on the amount C1 of constraint violation and the amount C2 of constraint conformity margin, i.e., according to the ratio (1/3, 1/2, or 2/3) responsive to which one of C1 and C2 is greater. Similarly to the case of the previous formula, the end time of a target optimization period to be set to a relatively late time (i.e., the time closer to T2 than to T1) when the amount C1 of constraint violation is relatively large, i.e., when the finish time T1 of a relaxed solution is situated at too early a time. Further, the end time of a target optimization period is set to a relatively early time (i.e., the time closer to T1 than to T2) when the amount C2 of constraint conformity margin is relatively large, i.e., when the finish time T2 of a best solution is so late as to provide a sufficient margin.

Setting the end time of a target optimization period based on the amount of constraint violation and the amount of constraint conformity margin allows time to be set in response to an index indicating that a relaxed solution is too early or that a best solution has too large a margin, thereby enabling efficient adjustment of the end time of a target optimization period. As a result, an approximate solution for makespan minimization is promptly obtained in a more efficient manner.

In step S7, the termination check unit 27 checks whether $T_{END}$ and T2 equal to each other. Since the time indication given by the time slot sequence number is discrete, repeating the optimization process a sufficient number of times causes $T_{END}$ to become eventually equal to T2. When $T_{END}$ and T2 are not equal, the procedure proceeds to step S8.

In step S8, the metaheuristic calculation unit 24 uses an Ising machine with respect to the end time $T_{END}$ of a target optimization period to derive an approximate solution. In step S9, the solution check unit 25 checks whether the derived solution is a solution violating a constraint. In the case of the derived solution being a solution violating a constraint, the procedure proceeds to step S10, in which the solution update unit 26 stores data indicative of the derived solution in the data storage unit 20 as the relaxed-solution data 20C. In the case of the derived solution being not a solution violating a constraint, the procedure proceeds to step S11, in which the solution update unit 26 stores data indicative of the derived solution in the data storage unit 20 as the best solution data 20D. Thereafter, the procedure returns to step S4, from which the subsequent processes are repeated.

When it is found in step S7 that $T_{END}$ and T2 are equal to each other, the optimization process comes to an end. The best solution data 20D existing at the termination of the optimization process is consequently regarded as a proper approximate solution for the makespan minimum solution.

Figure 8:
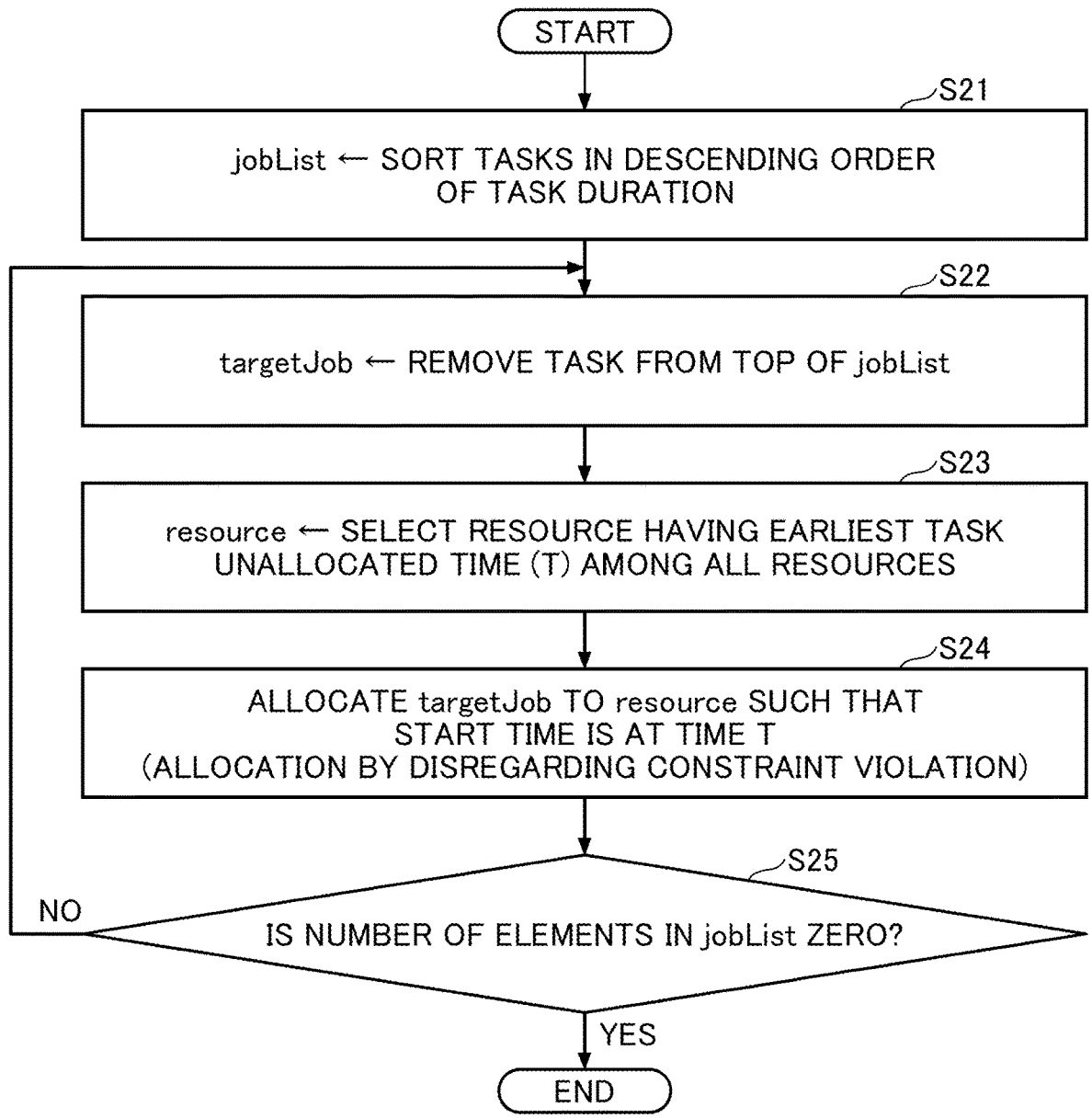
FIG. 8 is a flowchart illustrating an example of the procedure of generating a relaxed solution.

FIG. 8 is a flowchart illustrating an example of the procedure of generating a relaxed solution. The procedure of generating a relaxed solution illustrated in FIG. 8 may be performed by the relaxed solution generation unit 22 illustrated in FIG. 2.

In step S21, the relaxed solution generation unit 22 sorts tasks in the descending order of task durations based on the data of the task information database 20A. Namely, a task list is generated such that the task having the longest duration among a plurality of tasks indicated by the data of the task information database 20A is placed as the topmost list element, and the tasks are arranged such that the lower the place of a task in the list, the shorter the task duration is. The generated task list is stored as jobList in the data storage unit 20.

FIG. 9 is a drawing illustrating an example of a task list. An example of jobList generated by the relaxed solution generation unit 22 is illustrated as a list 61. The list 61 of this example includes 6 tasks which are arranged from the top in the following order: the task #1, the task #2, the task #3, the task #4, the task #5, and the task #6.

FIG. 10 is a drawing illustrating an example of the initial state of a model defining a resource-constrained project scheduling problem. The resource-constrained project scheduling problem illustrated in FIG. 10 is the problem in which the six tasks #1 through #6 are allocated to the three facilities 1 through 3, with the time range subjected to scheduling being from the time slot at 8:30 to the time slot at 15:30. In FIG. 10, the time periods highlighted in dot shading indicate the periods during which the indicated facilities cannot be used. The relaxed solution generation unit 22 is expected to allocate the six tasks included in the list 61 of FIG. 9 to the resources (i.e., facilities) in the model defined in FIG. 10.

In step S22 of FIG. 8, the relaxed solution generation unit 22 removes a task from the top of jobList, followed by designating the removed task as targetJob. In the example illustrated in FIG. 9, the task stored at the top of the list 61 is the task #1, so that this task #1 is removed and designated as targetJob.

In step S23, the relaxed solution generation unit 22 selects a resource having the earliest task unallocated time T, and designates the selected resource as "resource". In the initial state illustrated in FIG. 10, no tasks are allocated to the resources (i.e., facilities). Thus, the process in step S23 may select arbitrary facility, e.g., the facility 1, and may designate this selected facility as "resource".

In step S24 of FIG. 8, the relaxed solution generation unit 22 allocate targetJob to "resource" such that targetJob starts at the earliest task unallocated time T in "resource". In this allocation process, allocation is performed by disregarding constraints (e.g., the constraint requiring that a task is allocated only to the facility usable time).

Figure 11:
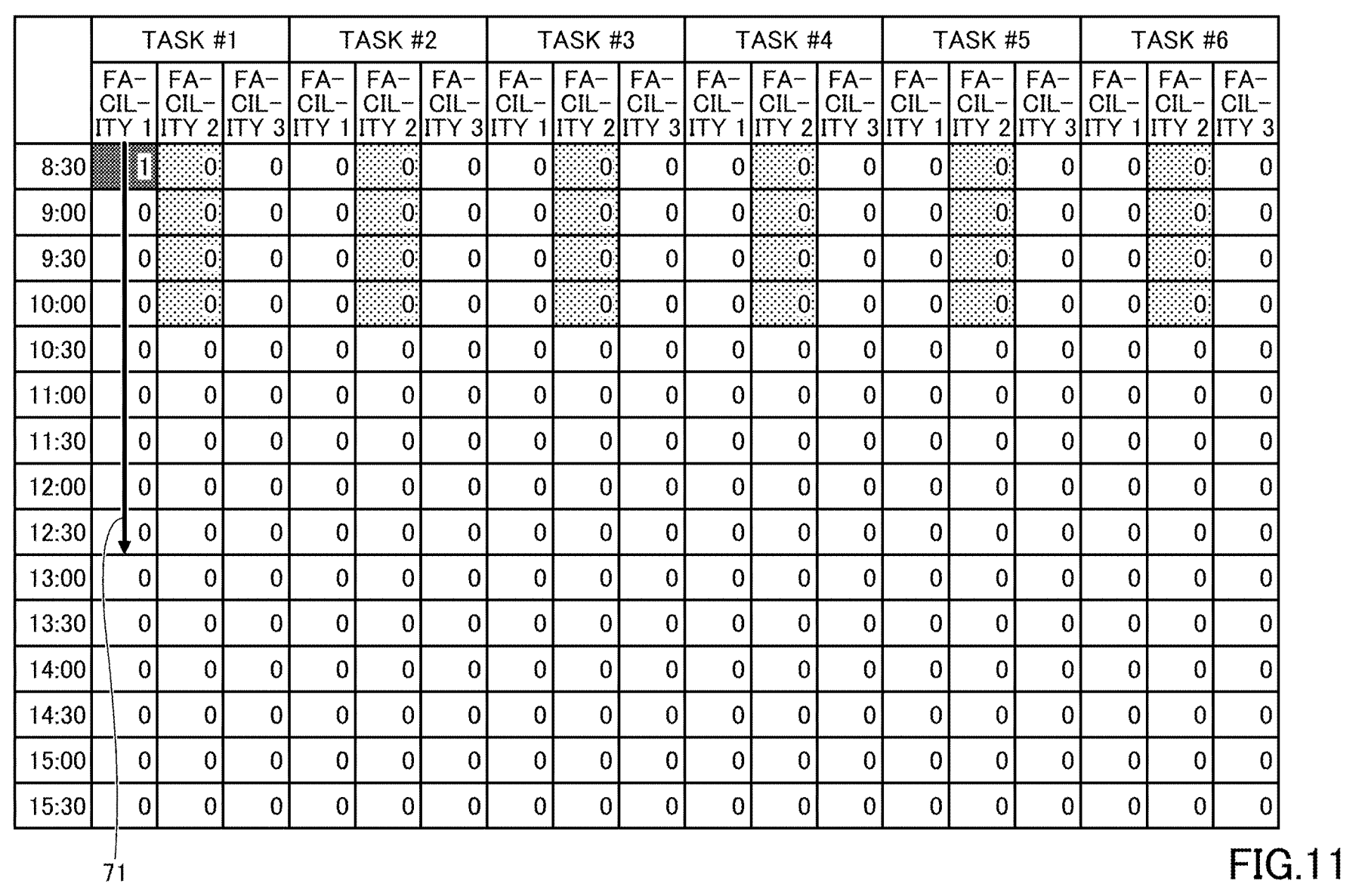

FIG. 11 is a drawing illustrating the state of the model defining a resource-constrained project scheduling problem as observed after allocating one task. As was described above, the task #1 is allocated to the facility 1 such as to start at 8:30 that is the earliest time to which no task is allocated in the facility 1. Thus, the state is such that the task #1 is allocated to the position indicated by an arrow 71.

In step S25, the relaxed solution generation unit 22 checks whether the number of elements in jobList is zero. When the number of elements is not zero, the procedure by the relaxed solution generation unit 22 returns to step S22.

The top of jobList existing at the time of return to step S22 is the task #2, so that the relaxed solution generation unit 22 removes the task #2 as targetJob. Steps S23 and S24 are then performed, which causes the relaxed solution generation unit 22 to allocate the task #2 to the facility 2. As a result of this allocation process, the current state following the state illustrated in FIG. 11 is as illustrated in FIG. 12 in which the task #2 is allocated as indicated by an arrow 72. In this allocation process, the task #2 is allocated to the facility 2 at the unusable time by disregarding the period during which the facility 2 is unusable (i.e., the period highlighted in dot shading). The procedure thereafter returns to step S22 again.

The top of jobList existing at the time of return to step S22 is the task #3, so that the relaxed solution generation unit 22 removes the task #3 as targetJob. Steps S23 and S24 are then performed, which causes the relaxed solution generation unit 22 to allocate the task #3 to the facility 3 as indicated by an arrow 73 in FIG. 13. The procedure thereafter returns to step S22 again.

Steps S22 through S24 are performed again, which causes the relaxed solution generation unit 22 to allocate the task #4 to the facility 3 as indicated by an arrow 74 in FIG. 14. In this case, the facility 3 has the earliest task unallocated time among the facilities 1 through 3, so that the facility 3 is designated as "resource" in step S23, and the facility 3 is selected as the place of allocation for the task #4.

Figure 16:
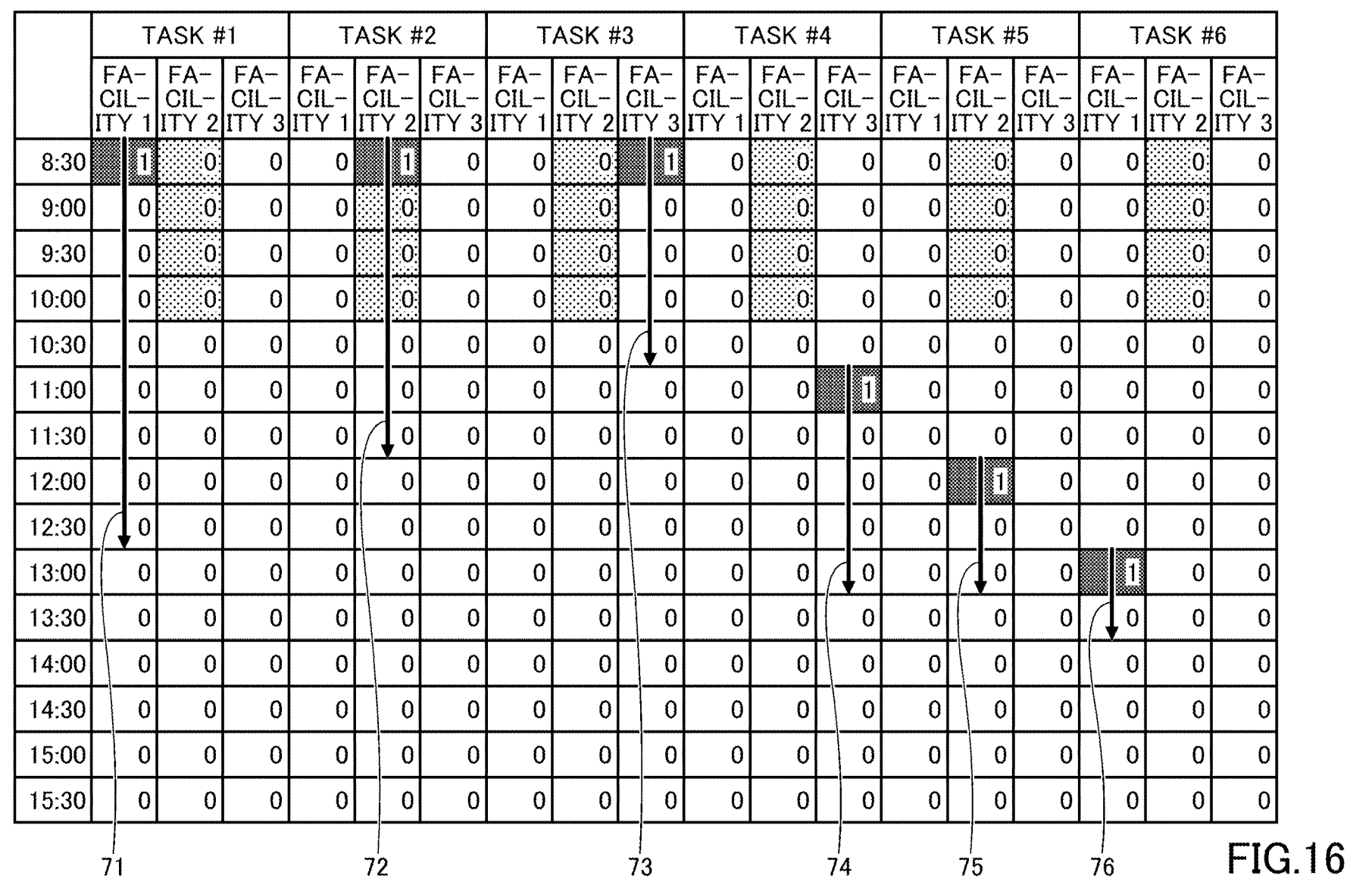

Subsequently, steps S22 through S24 are performed again, which causes the relaxed solution generation unit 22 to allocate the task #5 to the facility 2 as indicated by an arrow 75 in FIG. 15. Subsequently, steps S22 through S24 are performed again, which causes the relaxed solution generation unit 22 to allocate the task #6 to the facility 1 as indicated by an arrow 76 in FIG. 16.

Thereafter it is determined in step S25 that the number of elements in jobList is zero, which brings the relaxed-solution generation process of the relaxed solution generation unit 22 to an end. In the manner described above, the relaxed solution generation unit 22 allocates tasks to resources by using a deterministic algorithm by disregarding constraints, thereby providing a solution violating a constraint that will be used as the initial value of the relaxed-solution data 20C.

According to at least one embodiment, an approximate solution of a makespan minimization problem is obtained with high accuracy in a short time in the resource-constraint project scheduling problem.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processing apparatus for repeatedly obtaining a constraint violating solution, a constraint satisfying solution, and an approximate solution in a resource-constrained project scheduling problem, comprising:
   a memory;
   an Ising-machine-based metaheuristic calculation circuit that is dedicated hardware specifically configured to perform, by using an Ising machine, a metaheuristic algorithm by metaheuristically scheduling tasks to obtain the approximate solution that is either the constraint violating solution or the constraint satisfying solution, while ensuring that a finish time of any given task be no later than an end time of a target optimization period; and
   a processor coupled to the memory and configured to perform:
   finding a division point that divides an interval between a first finish time that is equal to a finish time of a latest version of the constraint violating solution and a second finish time that is equal to a finish time of a latest version of the constraint satisfying solution;
   setting, in the metaheuristic calculation circuit, the end time of the target optimization period at the division point;
   causing the metaheuristic calculation circuit to perform the metaheuristic algorithm to obtain the approximate solution;
   detecting a first event in which the approximate solution violates the constraint;
   detecting a second event in which the approximate solution satisfies the constraint;
   updating the first finish time with a finish time of the approximate solution in response to detecting the first event, thereby adjusting operating conditions of the metaheuristic calculation circuit; and
   updating the second finish time with a finish time of the approximate solution in response to detecting the second event, thereby adjusting the operating conditions of the metaheuristic calculation circuit,
   the approximate solution is repeatedly obtained by the metaheuristic calculation circuit while updating the first finish time and the second finish time.

2. The information processing apparatus as claimed in claim 1 wherein an initial value of the first finish time is a finish time of a solution that violates the constraint and that is obtained by a deterministic algorithm rather than by the metaheuristic algorithm.

3. The information processing apparatus as claimed in claim 1, wherein the end time of the target optimization period is set at a point in time at which an interval between the first finish time and the second finish time is divided with a predetermined ratio.

4. The information processing apparatus as claimed in claim 1, wherein the end time of a target optimization period is set at a point in time at which an interval between the first finish time and the second finish time is divided with a ratio corresponding to an amount of constraint violation of the latest version of the constraint violating solution and an amount of constraint conformity margin of the latest version of the constraint satisfying solution.

5. The information processing apparatus as claimed in claim 1, wherein the metaheuristic algorithm is performed to minimize an objective function that includes a plurality of constraint conditions, and the detecting the first event detects that the approximate solution satisfying one or more predetermined constraint conditions among the plurality of constraint conditions is the constraint satisfying solution, and the detecting the second event detects that the approximate solution not satisfying the one or more predetermined constraint conditions is the constraint violating solution.

6. The information processing apparatus as claimed in claim 1, wherein the metaheuristic algorithm is performed to minimize an objective function that includes a plurality of constraint conditions, and the objective function includes no term that evaluates a project completion time in the resource-constrained project scheduling problem.

7. A method of utilizing an Ising-machine-based metaheuristic calculation circuit and a processor for repeatedly obtaining a constraint violating solution, a constraint satisfying solution, and an approximate solution with respect to a resource-constrained project scheduling problem, the method comprising:
   the metaheuristic calculation circuit being dedicated hardware specifically configured to perform, by using an Ising machine, a metaheuristic algorithm by metaheuristically scheduling tasks to obtain the approximate solution that is either the constraint violating solution or the constraint satisfying solution, while ensuring that a finish time of any given task be no later than an end time of a target optimization period;
   finding, by the processor, a division point that divides an interval between a first finish time that is a finish time of a latest version of the constraint violating solution and a second finish time that is a finish time of a latest version of the constraint satisfying solution;
   setting, by the processor, the end time of the target optimization period at the division point in the metaheuristic calculation circuit;
   performing, the metaheuristic calculation circuit, the metaheuristic algorithm to obtain the approximate solution;
   detecting, by the processor, a first event in which the approximate solution violates the constraint;
   detecting, by the processor, a second event in which the approximate solution satisfies the constraint;

updating, by the processor, the first finish time with a finish time of the approximate solution in response to detecting the first event, thereby adjusting operating conditions of the metaheuristic calculation circuit;

updating, by the processor, the second finish time with a finish time of the approximate solution in response to detecting the second event, thereby adjusting the operating conditions of the metaheuristic calculation circuit; and repeatedly performing a process of finding the division point, setting the end time, performing the metaheuristic algorithm, detecting the first event, detecting the second event, updating the first finish time, and updating the second finish time until a difference between the first finish time and the second finish time becomes less than or equal to a predetermined value.

8. A non-transitory recording medium having a program embodied therein for causing an Ising-machine-based metaheuristic calculation circuit and a processor to perform a method to repeatedly obtain a constraint violating solution, a constraint satisfying solution, and an approximate solution with respect to a resource-constrained project scheduling problem, the program causing:

the metaheuristic calculation circuit being dedicated hardware specifically configured to perform, by using an Ising machine, a metaheuristic algorithm by metaheuristically scheduling tasks to obtain the approximate solution that is either the constraint violating solution or the constraint satisfying solution, while ensuring that a finish time of any given task be no later than an end time of a target optimization period;

the processor to find a division point that divides an interval between a first finish time that is a finish time of a latest version of the constraint violating solution and a second finish time that is a finish time of a latest version of the constraint satisfying solution;

the processor to set, in the metaheuristic calculation circuit, the end time of the target optimization period at the division point;

the metaheuristic calculation circuit to perform the metaheuristic algorithm to obtain the approximate solution;

the processor to detect a first event in which the approximate solution violates the constraint;

the processor to detect a second event in which the approximate solution satisfies the constraint;

the processor to update the first finish time with a finish time of the approximate solution in response to detecting the first event, thereby adjusting operating conditions of the metaheuristic calculation circuit;

the processor to update the second finish time with a finish time of the approximate solution in response to detecting the second event, thereby adjusting the operating conditions of the metaheuristic calculation circuit; and the metaheuristic calculation circuit and the processor to repeatedly perform a process of finding the division point, setting the end time, performing the metaheuristic algorithm, detecting the first event, detecting the second event, updating the first finish time, and updating the second finish time until a difference between the first finish time and the second finish time becomes less than or equal to a predetermined value.

* * * * *